(12) United States Patent  (10) Patent No.: US 7,490,350 B1
Murotake et al.  (45) Date of Patent: Feb. 10, 2009

(54) ACHIEVING HIGH ASSURANCE CONNECTIVITY ON COMPUTING DEVICES AND DEFEATING BLENDED HACKING ATTACKS

(75) Inventors: David K Murotake, Nashua, NH (US); Antonio Martin, Nashua, NH (US)

(73) Assignee: SCA Technica, Inc., Nashua, NH (US)

( * ) Notice: Subject to any disclaimer, the term of this patent is extended or adjusted under 35 U.S.C. 154(b) by 675 days.

(21) Appl. No.: 11/079,673

(22) Filed: Mar. 14, 2005

Related U.S. Application Data

(60) Provisional application No. 60/552,782, filed on Mar. 12, 2004.

(51) Int. Cl.
*G06F 15/16* (2006.01)

(52) U.S. Cl. .......................................... 726/11; 726/13

(58) Field of Classification Search ................ 726/1–4, 726/11–15; 709/224–225; 713/153–154
See application file for complete search history.

(56) References Cited

U.S. PATENT DOCUMENTS

| | | | | |
|---|---|---|---|---|
| 6,816,455 | B2 * | 11/2004 | Goldberg et al. | 370/230 |
| 6,850,252 | B1 * | 2/2005 | Hoffberg | 715/716 |
| 7,076,239 | B2 * | 7/2006 | Kirkup et al. | 455/411 |
| 2002/0035687 | A1 | 3/2002 | Skantze | |
| 2002/0080967 | A1 | 6/2002 | Abdo et al. | |
| 2002/0099959 | A1 | 7/2002 | Redlich et al. | |
| 2002/0147920 | A1 | 10/2002 | Mauro | |
| 2002/0166068 | A1 | 11/2002 | Kilgore | |
| 2003/0031151 | A1 | 2/2003 | Sharma et al. | |
| 2003/0095663 | A1 | 5/2003 | Nelson et al. | |
| 2003/0140238 | A1 | 7/2003 | Turkboylari | |
| 2003/0200455 | A1 | 10/2003 | Wu | |
| 2003/0204719 | A1 | 10/2003 | Ben-Itzhak | |
| 2003/0210788 | A1 | 11/2003 | Billhartz et al. | |
| 2003/0219129 | A1 | 11/2003 | Whelan et al. | |

(Continued)

FOREIGN PATENT DOCUMENTS

WO  WO 00/67445  11/2000

(Continued)

OTHER PUBLICATIONS

"Everbee Networks Introduces Secure Personal Networking Solution Based on Motorola PowerQUICC and Security Processors", [online] [Retrieved on Jun. 3, 2004] Retrieved from the internet <URL:http://www.emediawire.com/printer.php?prid=83724>, pp. 1-2, Everbee Networks.

(Continued)

*Primary Examiner*—Hosuk Song
(74) *Attorney, Agent, or Firm*—Vern Maine & Associates

(57) ABSTRACT

System and techniques for protecting wireless communication systems from blended electronic attacks that may combine wireless and computer attacks. One embodiment is an integrated hardware and software firewall/protection system that provides a protection scheme that may include an additional functional processing layer between the hardware firewall and a mobile terminal. This additional functional processing layer performs an extra layer of communications and security processing, including such features as management of Internet Connection Firewall (ICF) functions, key generation for firewall and virtual private network (VPN) functions, and packet inspection and filtering.

22 Claims, 12 Drawing Sheets

U.S. PATENT DOCUMENTS

| | | | |
|---|---|---|---|
| 2003/0220765 | A1 | 11/2003 | Overy et al. |
| 2003/0233567 | A1 | 12/2003 | Lynn et al. |
| 2003/0236990 | A1 | 12/2003 | Hrastar et al. |
| 2004/0003280 | A1 | 1/2004 | Narayanan et al. |
| 2004/0008840 | A1 | 1/2004 | Ferguson |

FOREIGN PATENT DOCUMENTS

| | | | |
|---|---|---|---|
| WO | WO 2004/068817 | A2 | 8/2004 |

OTHER PUBLICATIONS

"RG-Firewall", [online] [Retrieved on Mar. 26, 2004] Retrieved from the internet <URL:http://www.jungo.com/openrg/rgfirewall.html>, pp. 1-2.

"OpenRG for Wireless Gateways and Access Points", 2003, pp. 1-2, Jungo Software Technologies Inc.

"High Assurance Wireless Computing System (HAWCS)", [online] [Retrieved on Aug. 26, 2004], Retrieved from the internet <URL:http://www.hawcs.com/—High Assurance Wirless Computing System (HAWCS)>, pp. 1-2.

"Wireless LAN Security-What Hackers Know That You Don't", 2003, pp. 1-9, AirDefense, Inc., Alpharetta, GA.

"Everbee Embedded Software", [online] [Retrieved on May 13, 2004] Retrieved from the internet <URL:http://www.everbee.com/index.php?rub_id=2&sub_id=2>, 1994-2004, pp. 1-3, Everbee Networks.

"Everbee Secure", [online] [Retrieved on May 13, 2004] Retrieved from the internet <URL:http://www.everbee.com/index.php?rub_id=2&sub_id=6>, 1994-2004, pp. 1-3, Everbee Networks.

"Deepnines' Sleuth9 Security Immediately Stops", [online] [Retrieved on Mar. 8, 2004] Retrieved from the internet <URL:http://www.deepnines.com/press_releases/pr101403.html>, Oct. 13, 2003, pp. 1-2, DeepNines Inc.

"Everbee xNSP", [online] [Retrieved on May 13, 2004] Retrieved from the internet <URL:http://www.everbee.com/index.php?rub_id=2&sub_id=1>, 1994-2004, pp. 1-2, Everbee Networks.

"Security at the Gate. All in One", 2004, pp. 1-4, Everbee Networks.

"Everbee Networks Announces Hassle-Free PC Security Device For Families and Professionals", [online] [Retieved on Jun. 3, 2004] Retrieved from the internet <URL:http://www.prweb.com/printer.php?prid=106411>, 1997-2004, PR Web.

"3Com Embedded Firewall for the 3CR990 NICs Family", 2001, pp. 1-4, 3Com Corporation.

"3Com Embedded Firewall Architecture for E-Business", 2001, pp. 1-4, 3Com Corporation.

"The wireless hacker project", Apr. 2003, pp. 1-4, KPMG's UK Design Services.

"NVIDIA nForce3", [online] [Retrieved on Jun. 3, 2005] Retrieved from the internet <URL:http://www.nvidia.com/page/nf3.html>, 2005, pp. 1-2, NVIDIA Corporation.

"3rd Generation Partnership Project; Technical Specification Group Services and System Aspects; 3G Security; Security Threats and Requirements (Release 4)", 2001, pp. 1-26, 3GPP TS 21.133 V4.1.0 (Dec. 2001), 3GPP Organizational Partners.

* cited by examiner

ACHIEVING HIGH ASSURANCE CONNECTIVITY ON COMPUTING DEVICES AND DEFEATING BLENDED HACKING ATTACKS

RELATED APPLICATIONS

This application claims the benefit of U.S. Provisional Application No. 60/552,782, filed Mar. 12, 2004. This application is related to U.S. application Ser. No. 10/618,950, filed Jul. 14, 2003. Each of these applications is herein incorporated in its entirety by reference.

STATEMENT OF GOVERNMENT INTEREST

Portions of the present invention may have been made in conjunction with Government funding under contract number F30602-03-C-0183, and there may be certain rights to the Government.

FIELD OF THE INVENTION

The invention relates to high assurance connectivity for computing devices, and more particularly, to achieving high assurance wireless connectivity on computing devices and defeating "blended" hacking attacks.

BACKGROUND OF THE INVENTION

Methods to connect mobile devices by wireless means to the Internet have become prevalent around the world. The most popular of these methods is called Wireless Fidelity (WIFI), a wireless local area network (WLAN) technology typically conforming to IEEE 802.11a/b/g, BlueTooth and various other standards. The availability of wireless connection methods has stimulated many new products to be developed, such as "smart" wireless phones, wireless personal digital assistants (PDA), and plug-and-play wireless modules which add wireless Internet connectivity to laptop computers, PDA's and other mobile devices. These popular wireless devices are used to browse the Internet, send email and/or data, and may be used to conduct electronic commerce (eCommerce) including banking, stock trading and credit card transactions.

In an attempt to protect confidential information associated with eCommerce, such as credit card numbers, personal identification numbers, and passwords, wireless engineers have invented, and then standardized, techniques for encrypting information on a wireless link. Examples of such encryption include the so-called Wired Equivalent Protection (WEP) used by IEEE 802.11b, and WIFI Protected Access (WPA) used by IEEE 802.11g.

Unfortunately, wireless connections to the Internet, including WIFI, remain vulnerable to intrusion, exploitation and other forms of electronic attack by "hackers" using blended methods which combine attacks on the radio interface with attacks on the computer to which the wireless modem is connected. The following table generally summarizes some of the various hacker-based threats which combine attacks on the radio interface and the computer to which a wireless modem is connected.

| Threat Category | Attacks on Radio Interface | Attacks on Rest of the System |
|---|---|---|
| Unauthorized access to data | Eavesdropping signaling or control data: Intruders may eavesdrop data or control on the radio interface. This may be used to access security management data or other information which may be useful in conducting active attacks on the system. | Eavesdropping signaling or control data: Intruder may eavesdrop signaling data or control data on any system interface, whether wired or wireless. This may be used to access security which may be useful in conducting other attacks on the system. |
| Threats to Integrity | Manipulation of signaling or control data: Intruders may modify, insert, replay or delete signaling data or control data on the radio interface. This includes accidental and deliberate manipulation. | Manipulation of signaling or control data: Intruders may modify, insert, replay or delete signaling data or control data on any system interface, whether wired or wireless. This includes accidental and deliberate manipulation. |
| Denial of Service | Physical Intervention: Intruders may prevent user traffic, signaling data and control data from being transmitted on the radio interface by physical means. An example of this is jamming. | Physical Intervention: Intruders may prevent user or signaling traffic from being transmitted on any system interface, whether wired or wireless, by physical means. An example of physical intervention on a wired interface is wire cutting. An example of physical intervention on a wireless interface is jamming. Physical intervention involving interrupting power supplies to transmission equipment may be conducted on both wired and wireless interfaces. Physical intervention may also be conducted by delaying |

-continued

| Threat Category | Attacks on Radio Interface | Attacks on Rest of the System |
| --- | --- | --- |
| | | transmissions on a wired or wireless interface. |
| Unauthorized Access to Service | Masquerading as another user: An intruder may masquerade as another user towards the network. The intruder first masquerades as a base station towards the user, then hijacks his connection after authentication has been performed. | Masquerading as user: Intruders may impersonate a user to utilize services authorized for that user. The intruder may have received assistance from other entities such as the serving network, the home environment or even the user. |
| Repudiation | | Repudiation of user traffic origin: A user could deny that he sent user traffic. |

Some of these blended attacks are graphically shown in FIG. 1, which is derived from: "Security Threats and Requirements; 3GPP TS 21.133 V4.1.0 (2001-12); 3rd Generation Partnership Project, Technical Specification Group Services and Systems Aspects".

Ideally, a mobile wireless terminal and device utilizing wireless communications will possess as high a level of assurance and security as is available to a home or office personal computer, using a "wired" connection to the Internet as shown in FIG. 1. Here, a cable or digital subscriber line (DSL) modem 2 is used by the system to connect to the external Internet 1 and obtain packets of data. A firewall 3 is used to protect the network 6 and computers 4, 7, 8 behind the firewall, and performs several other functions.

One function performed by the firewall 3 is to electrically and functionally isolate the modem 2 from the computers 4, 7, and 8. Firewall 3 functionality can be performed either in software or in hardware. Software firewalls can effectively perform functional isolation, but electrical isolation can generally only be achieved by using a hardware firewall. Another function performed by the firewall 3 is network address translation (NAT), which alters the digital address of computers 4, 7, and 8 on the network behind the firewall 3. This makes it more difficult for a hacker 9 to attack the network server 4 and computers 7 and 8 on the protected LAN 6 with computer viruses and other malicious software (malware).

One of the functions performed by the firewall 3 is packet filtering, wherein packets entering the firewall 3 using open ports are screened for the presence of hostile data. Another function of the firewall 3 is to detect port scans by other computers on the Internet. Another function of the firewall 3 is to "stealth" unused ports, thereby reducing access for data packets from a hacker 9 to penetrate through the firewall 3 to the protected computers 7 and 8. In addition to the firewall 3 protection, note that the computers 7 and 8 may include optional biometric scanners, such as fingerprint scanners or other forms of biometric security device to provide local security.

A comparable system using a WLAN such as IEEE 802.11a/b/g or other wireless network is shown in FIG. 2. As in FIG. 1, the system connects to the Internet 1 via a wideband modem 2 (e.g., cable or DSL modem), a protective firewall 3, and a server 12. However, the local area network 6 is replaced a WLAN 14 by means of a WLAN access point 13 and a WLAN modem on the laptop computer 15. Also present on the network is a hacker computer 16 equipped with its own WLAN modem attached to the hacker computer 16 and, optionally, its own WLAN access point 17. The hacker computer 16 is also equipped with one or more hacker software tools, enabling the hacker to exploit security "holes" in the operating system or wireless applications of the victim computer 15.

In one example of a blended electronic attack by a hacker 16, consider the scenario where the WLAN 14 is an unencrypted WIFI network, which is a common occurrence. Here, a hacker 16 may employ the following attack: the hacker computer 16 employs its WLAN modem to first conduct an "Unauthorized Access to Data" attack on the WLAN 14 radio layer and determines the SSID code and channel for the WIFI wireless access point 13. Hacker computer 16 then attacks the victim's radio layer by setting the SSID code and channel for the desired WLAN 14, and entering the same radio network used by the victim computer 15.

Having successfully penetrated the radio layer, the hacker computer 16 may conduct several different types of attack on the victim computer 15 or server 12. For example, the hacker 16 may first conduct a "Threats to Integrity" attack on the victim computer 15, server 12, or both, and upload malware such as viruses, Trojan horses, or spyware to the victim computer 15, server 12, or both. Following the successful attack, the hacker 16 may subsequently employ an Unauthorized Access to Data attack since certain types of spyware/malware, such as keystroke repeaters, can compromise private personal information typed on, or stored in, the victim computer 15, such as personal account numbers and passwords. For simplicity, the term malware is used herein to mean any type of malicious software or code that is intended to inflict harm on a host computer (e.g., exercising unauthorized control over the host or negatively impacting host functionality), or to harm the user of the host, such as identity theft or stealing of financial information, passwords, and other personal information.

In another example of a hacker electronic attack, the hacker 16 may first attempt to employ an Unauthorized Access to Data attack on WLAN 14, only to discover the network is encrypted. Subsequently, hacker 16 may choose to employ a "Denial of Service" attack using its wireless modem, attempting to jam wireless service from the victim's wireless access point 13. If the Denial of Service attack is successful, the hacker then conducts an "Unauthorized Access to Services" attack by first masquerading as a base station by using its own wireless access point 17, then hijacking the connection after authentication has been performed. This can be done either by using the established wireless access point connection 17, or by connecting via its WIFI modem 16. Once having successfully penetrated the radio layer, as in the previous example the hacker computer 16 may conduct several different types of attack on the victim computer 15 or server 12.

A further scenario includes a virus, malicious user or a hacker that is able to compromise a host within a network. Once that host is compromised, a virus can leverage the trusted capacity of the host and gain access and exploit machines within the network. The virus or hacker could then reconfigure the radio on the system to perform outside the operational parameters authorized for the host system. In the case of a software defined military radio, the virus or hack could attack, penetrate, and reconfigure the radio to gain access to a higher security network/communication level. In this situation, the network and radio must be protected from a compromised host system.

The traditional military radios enforced a Red Black isolation scheme separated by an encryption/decryption unit referred to as an INFOSEC chip. This provides a boundary in the radio system between the encrypted network and the decrypted and sometimes classified data. Traditionally, these radios connected to a trusted network and thus did not have to worry about harmful data coming off of the channels. Thus, these radios had no other protection system besides security of the encryption. A newer class of radios has evolved, referred to as software defined radios. These radios and their systems run robust operating systems, typically communicating over IP networks and are now more vulnerable to attacks and malware. They can operate a multitude of different waveforms and some of these waveforms can also contribute in opening the system to attack.

Other systems offer certain protection mechanism, but their implementation are easily bypassed or otherwise defeated. For example, one product offering provides a protection system on a single chip but the design is a USB module that acts in parallel to the network flow of the data. The USB dongle exist on a shared bus that requires the network traffic to be routed into the device, thus this presents a system that is vulnerable to being bypassed since it is not inline/sequenced to the network data flow. A mis-configuration of the drivers or a malicious piece of software can cripple or disable the routing drivers, thus allowing the protection system to be bypassed.

What is needed, therefore, are robust techniques to protect computing platforms from wireless hacker attacks, even when using unencrypted wireless networks that is inline or serially coupled to the network flow.

SUMMARY OF THE INVENTION

One embodiment of the present invention provides a device for providing a blended protection scheme for a host (e.g., radio and computer subsystems) in high assurance wireless communication modules. The device can have a Red/Black architecture and includes an inline, embedded firewall for enforcing isolation between the outside network and the radio and host computer. As noted herein, the reference to the Red/Black architecture terminology is for illustrative purposes and is not intended as a limitation to a secured and unsecured schema employing the encryption/decryption separation. Likewise, the term mobile as used herein does not limit the invention to mobile devices as it applies to any wireless computing. The wireless module in other aspects can be configured to provide encryption and virtual private network (VPN) capabilities and other encryption methods for the host. A packet inspection system on the Red side may be adapted to receive decrypted packet data and to examine packet payload for malware, viruses or other such unwanted data. The packet headers can also be examined for correctness and routing information.

In one such embodiment, the device further includes a wireless module central processor (WMCP) on the Red side, providing booting and management operations. The WMCP is adapted for receiving the inspected data from the packet inspection system and providing that data to a host interface. Here, the WMCP can be further adapted to provide software defined firewall functionality to validate safety of the inspected data before sending it to the host interface. The WMCP can be configured to provide software defined radio functionality for the device.

The Black side of the device may further include a transceiver for receiving wireless communication from a wireless network, and a modem for demodulating received wireless communication before passing it to the firewall. The modem and transceiver can be configured to provide wireless communication such as IEEE 802.11a, b and g. The modem and transceiver functionality can also be integrated into a single unit, simply referred to as a modem. In addition, the black side functionality can be software defined wherein the modem functionality is provided by a process(es) running on a general purpose processor (GPP) and or field programmable gate array (FPGA) or other such processor.

In response to a determination that the packet payload is unsafe, the packet inspection system can be further configured to correct or discard data. The host can be, for example, a wireless mobile communications device including a PC, laptop, PDA, mobile email device, or server.

In one particular embodiment, the present invention further includes a demilitarized zone (DMZ) between the Red and Black sides. This DMZ is configured to process data from the firewall before allowing data to pass to the Red side. Such DMZ processing may include an additional security screening. The device can be integrated, for example, into a wireless modem, a USB module, a plug-and-play PC card module, a PCI card module or other bus structures such as a shared processor bus and switched fabric, or a motherboard of the host including an integrated chip or chip set.

Another embodiment of the present invention provides a device for providing a blended protection scheme for a host (e.g., radio and computer subsystems) in high assurance wireless communication. The device has Red/Black isolation architecture and includes a wireless module central processor (WMCP) running an embedded firewall, enforcing isolation and separation between a Red side and an Black side. The WMCP is configured to provide encryption and optional virtual private network (VPN) capabilities for the host. A packet inspection module on the Red side is adapted to receive decrypted packet data, and to examine packet payload for malware. Note that packet headers can also be examined for correctness, if so desired. In one such embodiment, the packet inspection module is integrated into the WMCP.

The WMCP can be further configured for providing booting and management operations, and adapted for passing inspected data to a host interface. The WMCP can have access, for example, to one or more memories for performing boot and management operations. The WMCP can be further adapted to provide a stateful packet inspecting (also known as dynamic packet filtering), embedded firewall functionality to validate safety of the data/transmission before sending it to the host interface. The WMCP can also provide software defined radio functionality for the device. The device can be integrated, for example, into a wireless modem, a USB module, a plug-and-play PC card module, a PCI card module or other processor bus architecture such as a switched fabric, or a motherboard of the host, including an integrated chip or chip set.

Another embodiment of the present invention is a device for providing a blended protection scheme for a host such as a radio and computer subsystem in multi-channel high assurance wireless communication. The device has Red/Black isolation architecture and includes a Black side CPU that is adapted to host modems of first and second channel communication sets. The Black side CPU is protected an embedded firewall from the outside network. This protection also extends to the Red CPU and the Host system. A reconfigurable encryption/decryption unit is also provided for enforcing isolation and separation between the Red side and the Black side, and for passing Black side data to and from modems of the first and second channel communication sets. This reconfigurable encryption/decryption unit can optionally be configured to provide virtual private network (VPN) capabilities for the host. A Red side CPU may be adapted to manage security functions, and to reconfigure the reconfigurable encryption/decryption unit. The Red CPU is generally protected by at least one embedded firewall from an attack originating from the Host system. A high assurance wireless system's security functions can include, for instance, at least one of automatic public/private key exchange, Red side encryption/decryption, network address translation (NAT), port address translation (PAT), Internet routing, management of demilitarized zone (DMZ) router functions, detection of port scanning, packet filtering, threat signature detection, and concealment of unused ports.

One embodiment further includes a first channel communication set including a modem, the set adapted to receive a first type of communication signal and to demodulate that signal. Also included is a second channel communication set including a modem, the set adapted to receive a second type of communication signal and to demodulate that signal. A Black side bus (e.g., PCI bus or switched fabric) is provided for communicatively coupling the Black side CPU to the modems of the first and second channel communication sets, and a Red side bus, such as a PCI bus or switched fabric, is provided for communicatively coupling the Red side CPU to the firewall. In one such embodiment, the first channel communication set is implemented on a first integrated chip or chip set, and the second channel communication set is implemented on a second integrated chip or chip set. In another such embodiment, the modems of the first and second channel communication sets include transceiver functionality and are software-reconfigurable. Reconfiguration, if supported by the system, is performed by the Black side CPU, which downloads verified software from the Red side CPU via the Red side bus, the reconfigurable firewall, and the Black side bus.

The first channel communication set can be configured, for example, to IEEE 802.11a/b/g (WIFI) communication, and the second channel communication set may be configured for BlueTooth communication. Any combination of wireless technologies can be employed and are within the scope of the invention. The Red side CPU, the reconfigurable firewall, and the Black side CPU can also be implemented on an integrated chip or chip set. The Red side CPU can be further configured to automatically exchange public and private encryption keys. The reconfigurable firewall can be implemented, for example, in one of field programmable gate array (FPGA) and or software communication architecture (SCA) technology. The reconfigurable firewall can also be implemented with a purpose built semiconductor such as an ASIC.

The device may further include a plug-and-play/hot swap interface (e.g., PCI adapter) to couple the Red side bus to the host. In one particular embodiment, a log file of detected attacks and other selected security incidents are logged and stored in at least one of a memory accessible by the Red side CPU and a host system memory. In another particular application, the Red side CPU is integrated into a host CPU of the host, and the reconfigurable firewall couples the Black side CPU to a host bus. The device can be integrated into a wireless plug-and-play module or a motherboard of the host as an integrated chip or chip set.

Such configurations have several benefits. The firewall and protection systems are outside of the host PC, thus if the host is compromised by another means, the protection systems will still function. If a host is running a software based firewall, a root level malware or virus component could disable or bypass the software firewall and leave the host system unprotected. Also, since the software firewall is running on the target/host system, an attack against the firewall is possible and can provide a means for an attacker to gain access to said host. Thus, by placing the firewall and possibly other protection systems outside of the host, the protection system itself cannot be as easily attacked or disabled. Furthermore, the system design is such that all data must pass through the protection system and cannot be rerouted around or bypassed. It is further advantageous that the Radio module be protected from the host system in the case the host system becomes compromised and thus helps to protect the integrity of the network. The host side firewall can also watch all outgoing connection attempts and in conjunction with the device driver running on the host, and can request authorization for the various programs attempting access.

These protection mechanisms for a system can be incorporated into a single chip or processor that can be embedded inside a system. This single chip could be an ASIC, an FPGA or even an embedded GPP. Such locations for embedding this chipset include integration in the wireless radio as described herein. Another location for embedding the chipset includes incorporating the chipset on a computer's motherboard and residing between the PCI, USB and other peripheral buses and the CPU and memory. This chipset would typically be placed inline to the data path and would examine the data for IP stream. It could then examine this data and take appropriate measures like packet inspection and firewalling.

There are examples of motherboard firewall chipsets that are designed to protect the Ethernet interface of the motherboard, but these provide no protection for other network devices like a PCI Ethernet cards, PCMCIA wireless cards or USB wireless dongles. These devices open up the computer and the onboard firewall offers little or no protection. A better system would be one that sits between all the attached peripheral busses and the CPU and memory systems. Such a system would analyze the data traversing these busses and enforce its protection mechanisms on all network types of traffic. This would allow data, such as disk access, to pass through the device without inspection but would inspect all network traffic. It could be further envisioned that such a system could also inspect all data including disk access, allowing for automatic encryption and decryption of data, including but not limited to data written and read from removable devices such as USB flash drives or notebook hard drives. This chipset functionality could be built into the motherboard's chipset.

In one aspect, this all-in-one inclusive chipset could also be split into two different chipsets to exist in different parts of a radio. Such an example would be one chipset on the Red side of a radio and one on the Black side of a radio. This would allow the separate chipset to provide the exact and necessary protection mechanisms for each portion of the radio.

It is envisioned that such protection mechanisms could be defined in software and included as a part of a waveform download. This would allow an appropriate placement of the protection mechanisms in a software defined radio since the security would be built with the waveform specifications in mind and inline to the path of the dataflow.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTIONS OF THE INVENTION

Figure 1:
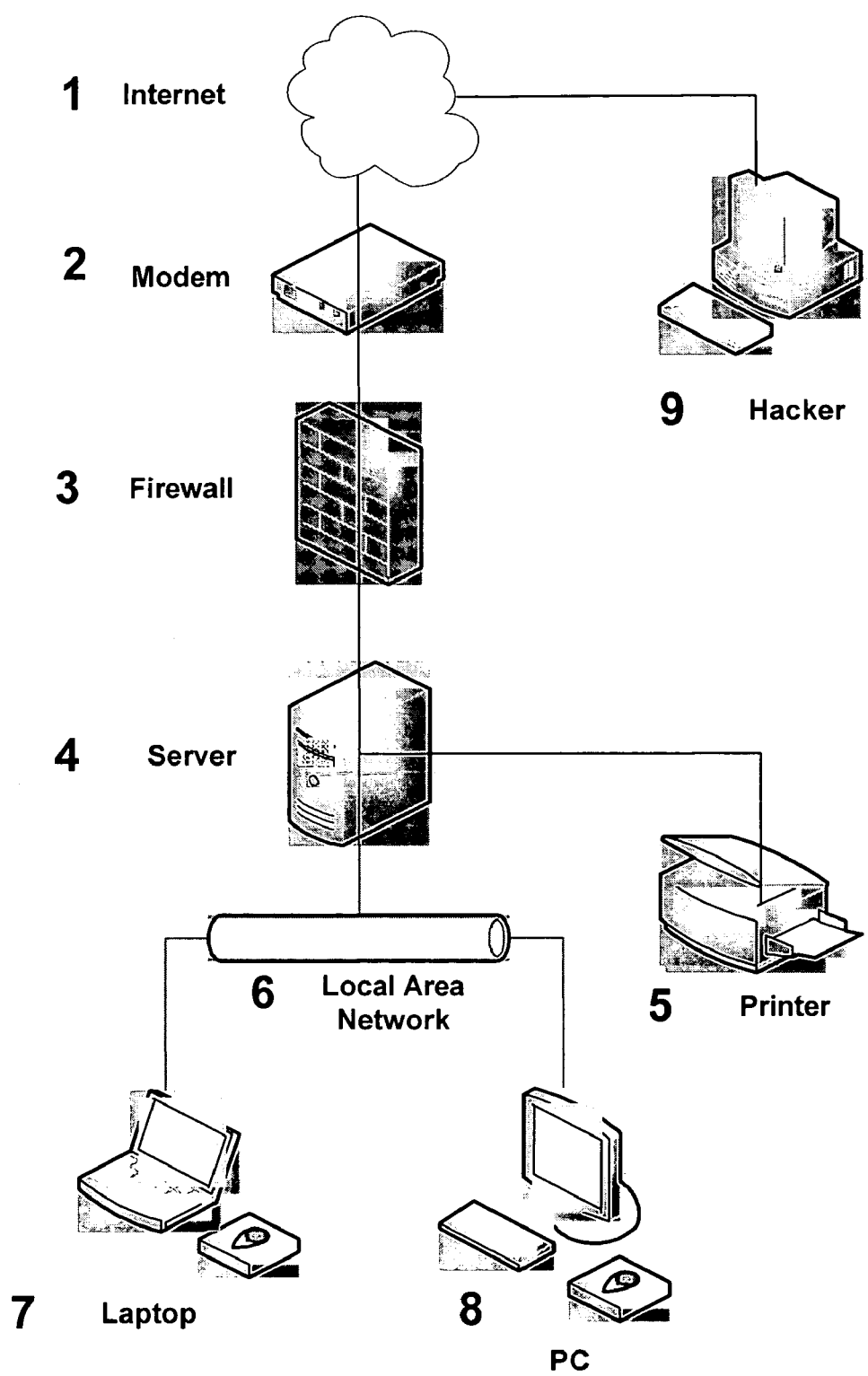
FIG. 1 shows a typical security scheme available to a home or office personal computer, using a wired connection to the Internet.
Figure 2:
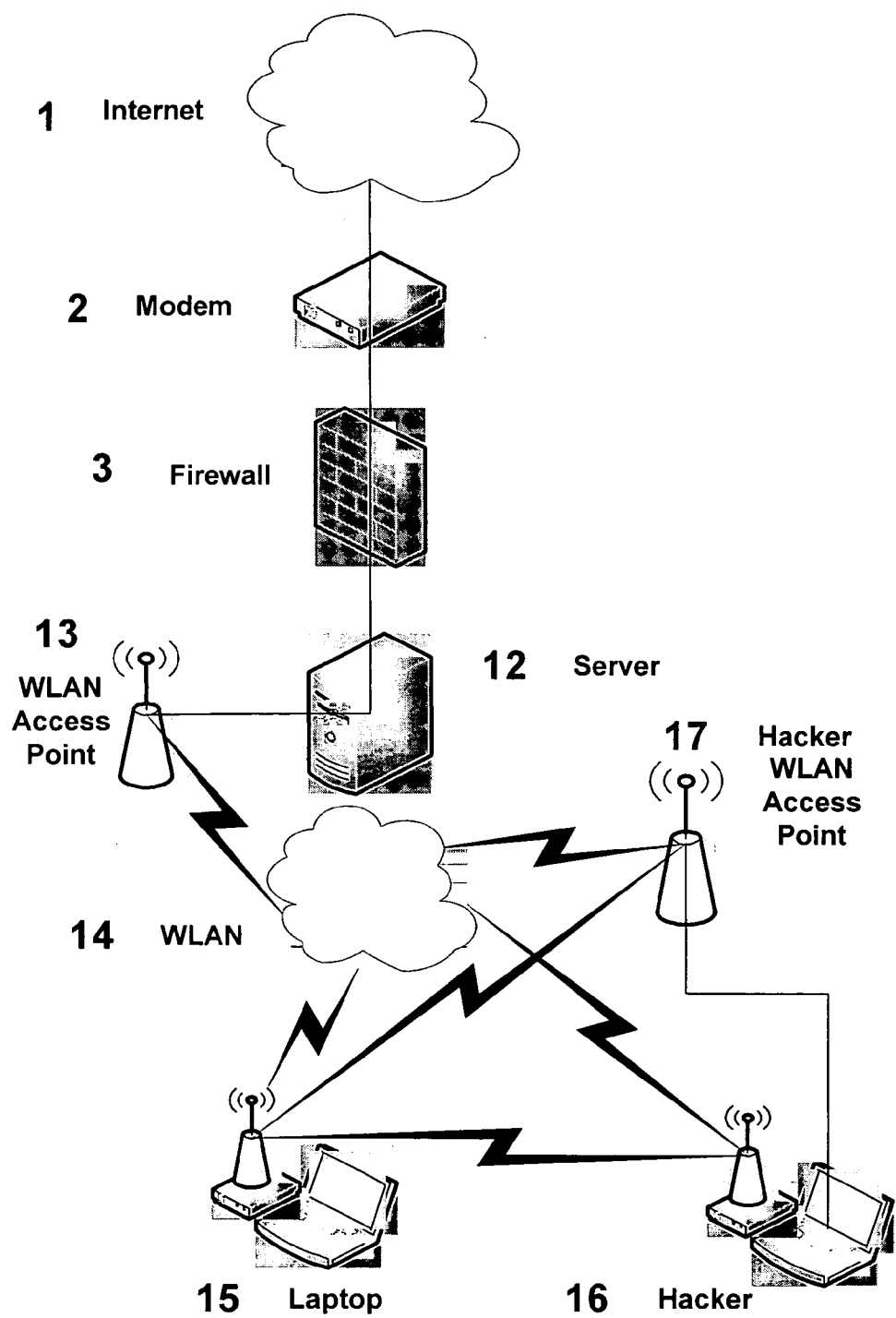
FIG. 2 shows a typical security scheme available to a home or office personal computer, using a wireless connection to the Internet.

Embodiments of the present invention provide techniques for protecting communication systems from a blended attack combining wired/wireless and computer attacks. This is accomplished by various firewall and protection systems, thereby providing a blended protection scheme. One embodiment of the protection systems may even be integrated into a wireless modem.

General Overview

Mobile communication systems (e.g., laptop, PDA, mobile email device) using a wireless modem, and mobile servers (e.g., WIFI server) using a wireless access point are protected against a blended electronic attack combining wireless and computer attacks. Non-mobile communication device such as networked computing devices using wireless modem devices are also protected using the teachings of the present invention. Furthermore, wired communication systems (mobile and non-mobile) coupled via wired and/or wireless techniques are also vulnerable to hackers and are protected by the blended protection of present invention.

In one embodiment the blended protection is provided by the use of at least one additional functional processing layer between the firewall and the terminal. This additional functional processing layer provides an extra layer of communications and security processing, such as management of Internet Connection Firewall (ICF) functions, key generation for firewall and virtual private network (VPN) functions, and packet inspection and filtering (in the case of a wireless modem). In its most basic form the present invention need not be a blended protection and there need not be an additional processing layer.

The processing layer can be implemented, for example, using a conventional reconfigurable logic device such as a field programmable gate array (FPGA), programmable logic device (PLD), general purpose processing unit (GPPU) or other suitably configurable processing environment. Such a device provides a blended solution of hardware and software based protection, and can be integrated into existing architectures to provide a robust protection scheme for protecting devices using a wired topology or a wireless topology such as a wireless modem, a wireless access point, or a wireless server.

For example, in the case of protecting a modem (wired or wireless), the blended solution can be integrated into a single plug-and-play PC card module or embedded mini PCI card module or switched fabric module. Alternatively, the blended solution can be built into the motherboard of the mobile device, serving as a host process for plug-and-play communications devices such as WIFI modems connected to the mobile device. For example, this alternative approach may be built into existing mobile computing chipset architectures, such as the Intel Centrino.

In the case of protecting a mobile server, the blended solution can be integrated into a motherboard of the mobile server, serving as a host process for plug-and-play communications devices such as WIFI wireless access points connected to the mobile device. This architectural approach may also be built into existing mobile computing chipset architectures such as Intel Centrino. In the case of protecting a wireless access point, the blended solution can be integrated into a motherboard of the wireless access point.

Note that mobile access points include, for example, routers, PCs, laptops, and servers. Further note that mobile communication systems are intended to include any device or system that communicates via a wireless modem, including a home-based PC. For example, wireless modems include WIFI modems, 802.11a, b and g modems, Blue Tooth modems, wireless USB modems, CDMA modems, GSM modems, analog modems, and other such wireless communication modems. Such a wireless modem can be implemented on plug-and-play cards or devices, PCI cards, PCM-CIA cards, external USB devices, external IEEE 1394 Fire wire devices, or the motherboard of the system communicating wirelessly. In general, the wireless modem can be integrated into any conventional PC module or card. Likewise, the blended protection can be integrated into PC modules of wired systems to enable the protection of the present invention. The integrated hardware and software protection schemes can be implemented, for example, by any of the following: incorporating one or more firewalls into a wireless modem; incorporating a malware protection system into a wireless modem; incorporating a spam/unsolicited email protection system into a wireless modem; incorporating a packet inspection system into a wireless modem; incorporating a public key encryption method into a wireless modem; incorporating of a virtual private network (VPN) into a wireless modem; and incorporating Red Black security isolation into a wireless modem.

The firewall could be, for example, a hardware firewall chip, a firewall embedded/software running on a separate processor; a firewall embedded/software running on a shared processor; a security chip providing Red Black separation; a packet-filter firewall system; a stateful inspection firewall system; a firewall system that can provide NAT and port address translation (PAT); and any other conventional firewall mechanisms (hardware or software) or any combination of firewalls and corresponding functionality.

The system could employ more than one separate firewall or the same firewall in a split configuration to protect the communication module, blocking unknown or unauthorized data from the network and from the host system. This increases the integrity of the communication module as it prevents hack attempts, attacked, unauthorized communications from both communication sides of the radio.

The firewall could be in communication with the device driver on the host and could be responsible for validating outgoing connections. This would allow the communication module and the device driver to verify that the applications on the host system, attempting to gain outside access, are authorized. Furthermore, the firewall could contain a black list of urls/sites/domain names to which access is restricted. This list could be populated with known spammer, malware and spyware related URLs and/or domain names. This would help to restrict spyware, malware, keyloggers and other such unwanted processes by blocking their attempts to upload and or download data and denying access to the known domains such data is sent and retrieved. Such a list could be updated and configured automatically through a web based service as is known in the art.

The computer virus or malware protection system, and packet inspection systems, could be, for example, a system that inspects email data looking for virus attachments; a system that inspects incoming communication data packets looking for viruses; a system that inspects communication data in real time looking for viruses; a system that inspects communication data in real time looking for viruses and corrects the data or ends the transmission before the virus can reach the connecting host; a system that inspects email data looking for virus attachments in real time and changes the attachments file extension before the virus can reach the connecting host; other conventional virus protection schemes or any combination of virus protection means and functionality. The malware protection system could further be configured to scan incoming data (e.g., email, packet data) for spyware. Note that the degree of sensitivity of this scanning could be set based on user preference. For instance, the highest setting would refuse cookies and any other type of spyware, and a middle setting would allow for cookies, but refuse any executable programs such as keystroke monitors and drive scanners looking for personal data. Variations on the level of protection provided by the malware protection systems configured in accordance with the principles of the present invention will be apparent in light of the present disclosure.

The spam/unsolicited email protection system could be, for example, a system that examines incoming email data and removes the email data if it is deemed to be an unsolicited email; a system that examines incoming email data and marks the email data if it is deemed to be an unsolicited email; a system that examines incoming email data and marks the email data if it is deemed to be an unsolicited email so the email client on the PC can automatically move it into a separate folder; other conventional spam/unsolicited email protection mechanisms or any combination of spam/unsolicited email protection means and functionality. Note that the functionality spam/unsolicited email protection system could be passed off to the host computer.

Another, more robust packet inspection system could be, for example, a system that examines incoming data/communication packets for patterns of data that are considered harmful and takes appropriate action based on the content of said packet; a system that examines incoming data/communication packets for patterns of viruses and takes appropriate action to disable the virus data; a system that examines incoming data/communication packets for patterns of spam and takes appropriate action to disable/remove the spam data; other conventional packet inspection mechanisms or any combination of packet inspection means and functionality.

A packet inspection system could be as simple as a URL and/or domain name filter based on a block list or as complicated as a deep scanner that can detect known viruses, worms, spyware, and other unwanted data. A packet inspection system could not only examine incoming data but outgoing as well.

A system integrity process could be, for example, a running process that validates all processes are running, that the processes have not been compromised, and are responding properly. The system integrity checker could poll the various processes running on the communications device/radio, verifying they respond back properly and in a timely manner. It could also check that the process images on flash have not been altered in an unauthorized manner.

It will be apparent in light of this disclosure that the integrated hardware and software protection schemes configured in accordance with the principles of the present invention can readily be extended to the protection of any type of individual systems in a wired network as well. In this sense, the present invention is not intended to be limited to wireless systems or mobile devices. For example, an alternative embodiment provides a method of protecting a communication system from a blended electronic attack combining wired, wireless and computer attacks, by the use of an integrated hardware and software firewall/protection systems built into the system communication module(s). Here, the communication modules can be, for example, Ethernet cards, USB interfaces, serial connections, or any external connection/interface for a system. To protect a system from a blended attack, the attacks generally must be stopped or cleansed before they enter a system. One means of stopping an attack before it enters into the system is to stop the attack at the point the system interfaces to an external network. For instance, in the case of a USB connection, the means of stopping the attack and or protecting the system would be at the point where the system interfaces with the USB network. In the case of a wired LAN, the means of stopping the attack and/or protecting the system would be in the network card or at the point the network interfaces with the system. In the case of a serial connection, it would be at the system's serial interface. In the case of a wireless network, it would be at the wireless card, in the wireless module and or at the point the system interfaces with the wireless network. In any external connection, the means of stopping the attack and/or protecting the system is typically improved at the point the system interfaces with the external connection.

In the case of a wireless card, a firewall provides a component of the overall blended protection scheme. In particular, by placing a firewall in the wireless card that can be controlled/configured by the systems drivers, the system is protected from intrusion by users in the local wireless network and/or in external networks.

As noted herein, optional components can be used to increase security, and these components can be included within the wireless device. For example, biometric scanners could be incorporated into the wireless module device, like a PCMCIA card. This would have the additional benefit of reducing the number of devices attached to the host system. Other devices could be added to the wireless module in an attempt to reduce the number of devices that must plug into a host and such devices could also include a firewire port or a USB port.

System protection can be further extended by placing a malware component (e.g., virus checker or aggressive spyware scanner) in the wireless card. The malware detection and removal component could monitor email traffic for attachments, and check for specific bit patterns that represent viruses. It could also alter certain email attachments like .exe, .cmd, .bat, .vbs or others that pose a threat where the attachment can be executed. In this way, a user cannot inadvertently open the attachment when the email arrives.

Spam email also provides security issues for system users. JavaScript and identifying HTML image links can be embedded in an email and are automatically run when a user views the email in an html enabled email browser. A spam protection component of the blended protection scheme could scan emails for such data/links and disable them. It could also view email header information and if the header is not correct, re-label the subject so that the email client can route it into a junk email folder. Such methods help to prune the amount of spam received.

A packet inspection component of the blended protection system can provide yet another level of protection by inspecting not only the packet header information but also the packet content for malicious data, and by taking the proper steps to correct/remove/change the data or to inform the connected system about the data, letting it make the decision on how best to correct the data.

A protocol firewall is responsible for examining and filtering wireless protocol messages that are sent in a wireless network. One form of a denial of service attack against an 802.11 modem is to constantly send the modem a protocol message telling it to disconnect from the network. The 802.11 stack/modem will receive the disconnect message, drop its connection to the wireless network and then attempt to reconnect. In a Windows XP system, the host operator will see a message that connection was lost to the wireless network, and then a message that a connection was reestablished. A new disconnect message will be received and the process will repeat. This is a simple and effective way to prevent a wireless client from staying connected to an access point. A protocol firewall would be capable of discarding/filters such messages.

It could also recognize that this attack is taking place by examining the frequency of the disconnect message packets. If the frequency is above the threshold, they are blocked or ignored.

Another means of protocol attack on an 802.11 network is called packet injection. In this attack, an attacker reads in the data packets on the network and broadcasts the exact same packet number with a new payload. Such a payload might redirect a web browser to an unwanted site. In this attack, over the air are two packets with the same 802.11 protocol and routing information. A protocol firewall could see that there are two packets and examine the signal strength of each packet receive. It could reject the packet with a signal strength that does not match the historical strength of the wireless communication.

A System Integrity Daemon (SID) is a running process responsible for verifying the host system is functioning correctly and reporting abnormalities. Some example of functional checks can include, but are not limited to, verifying all necessary processes are running, verifying available resources, such as memory, are not close to max limits, examining system logs for abnormalities, and "pinging" or calling various running processes to see if they respond in time. A System Integrity process can run these checks on a predetermined cycle (or upon request) and can report problems and errors to the Host or to other communication nodes on the wireless network. In one such example, the SID attempts to "ping" to verify the connected host is still alive. Within the allotted time period for the response, if no reply is received back from the Host, the SID sends out a warning over the wireless network to a designated server with information that the Host might be in trouble. In a second example, if the SID finds current memory utilization is above a predetermined threshold and a new and unknown process(es) is responsible for taking up all the memory, it reports the memory utilization and process information to the Host. The SID could then respond to a Host request or to a pre-scripted event to stop and/or restart the process in question.

Additional security may be achieved by automatically enabling a public key exchange in the wireless communication. Before sending data to a remote system, the blended protection module of the system can be configured to confirm it has the remote system's public key. If it does not, the module automatically attempts to send a request for public key. This request can happen on a separate, unused port where the sender will attempt to make a request by connecting to the remote devices port specified for automatic key exchange. If the requester is able to successfully connect to the key exchange port, the remote system responds by sending its public key. At this point, the sending system would have the public key for the target of the data to be sent and could store it in memory for later usage. The sending system then uses remote system's public key to encrypt the data packet, tags it as public key encrypted, and then delivers the data to the remote system. The remote system receives the data, examines the packet to see if it is tagged for public key encryption and if so, uses the private key to decrypt the data.

By enabling an automatic means of public key exchange, no other system that intercepts the data packets would be able to decrypt the messages. The only system, even in a trusted network, that could decrypt the data packet is the target system. This basically allows for the ability to automatically and transparently set up a secure VPN between two points. Conventionally, such VPN capabilities are enabled inside a computer, and require installation of new software and/or drivers and potentially complex user setup. By enabling a public key exchange inside a blended protection module, for example a wireless card, the communication level security is greatly enhanced and simplified when broadcasting data for anyone to capture.

Further note that this allows any two systems (e.g., a PDA and a computer), having diverse operating systems and/or architecture to easily and transparently exchange data in a secure and encrypted manner, with the operators only required to use a network card with the functionality enabled. It will be apparent in light of this disclosure that automatic VPN capabilities between two points, especially in a wireless network, greatly increase the security of the communication. By enabling automatic VPN communication inside a blended protection module, any diverse system can communicate securely without having to change the systems with which the module is attached.

By incorporating such individual defensive components into the overall blended protection scheme into a single module, a higher level of protection is provided that is capable of stopping multiple levels of attack by providing a unified protection system, as opposed to a group of separate, individual pieces of hardware and software. Note that offensive components can also be integrated into the blended protection module that attempts to identify the source of malicious data or hacking activity. The source could then be reported to authorities, if desired.

Blended Protection Module Architectures

Figure 3:
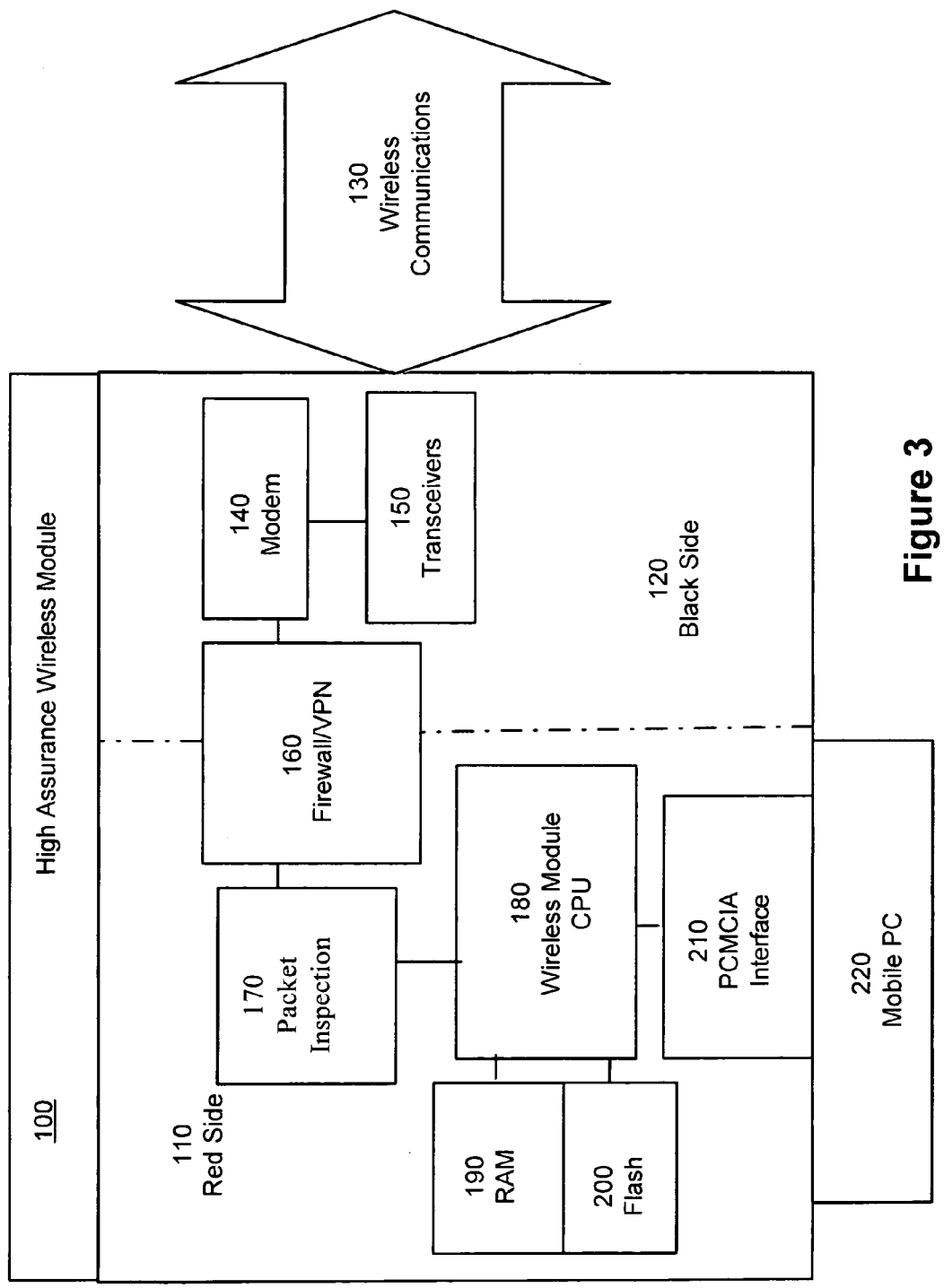
FIG. 3 illustrates a block diagram perspective of a high assurance communications module configured with a blended protection scheme including a firewall, WMCP and packet inspection.

FIG. 3 is a block diagram of a high assurance wireless communication module 100 configured with a blended protection scheme in accordance with one embodiment of the present invention. The communication module can be, for example, a Personal Computer Memory Card Industry Association (PCMCIA) module, a plug-and-play PC card module, a Compact Flash (CF) module, a Universal Serial Bus (USB) module, a cell phone or other such modules. While certain embodiments are shown using wireless elements, it should be readily apparent that the present invention is not limited to wireless systems.

The high assurance communication module 100 in this embodiment utilizes security Red/Black isolation architecture. In particular, a Red side 110 and a Black side 120 are provided, with the isolation and separation being enforced by a hardware firewall chipset 160 that also may provide the encryption and VPN capabilities for the host system.

The modem 140 and transceivers 150 are configured to provide wireless communication 130 such as IEEE 802.11a, b and g. Note, however, that the other communication protocols can employ various embodiments in conjunction with the present invention. The overall system booting, management, and communication is provided by the wireless module central processor (WMCP) 180, which has access to RAM 190 and flash 200 for booting and for operations. The WMCP 180 has a PCMCIA interface module 210 for interfacing into the mobile PC/host system 220. There are other interface modules that can be used depending on the type of communication module.

The WMCP 180 can also provide software defined radio functionality for the module like a software communication architecture (SCA) kernel. The WCMP 180 employs a Hardware Abstraction Layer (HAL) and supports application programming interfaces (APIs) for reconfiguration of the firewall 160 and other components. In one embodiment, hardware abstraction is achieved by the use of a Java2 based WCMP, such as the "aJile" aJ-100, and supporting Java2, MID-P and Wireless Toolkit functions and applications. Furthermore, the system could be extended to implement the modem 140 and transceivers 150 either as a single or a series of more general/reconfigurable processors to operate an SCA. For higher assurance, an optional packet inspection system 170 monitors the data packets after they have been filtered through the hardware firewall 160 and VPN, examining the packets for undesirable data/payloads, filter or altering the packets as needed.

In operation for this embodiment, data arrives via the wireless communications network 130 into the transceivers 150, and then is demodulated at the modem 140. The hardware firewall 160 and VPN checks to see if the data arriving is allowed past the Black side 120 into the Red side 110. If the data is expected or arriving from a known source, the port is not blocked and the data is allowed to pass. The data is then decrypted, if necessary, before being passed on to the packet inspection system 170. The packet inspection system 170 examines not only the packet header for correctness, but also the packet payload for any known viruses or other malicious software. If the payload is deemed unsafe, the packet inspection system 170 can take the necessary actions to correct or discard the data. Once the data is deemed safe by the packet inspection system 170, it is then handed onto the WMCP 180. The WMCP 180 can also provide software defined firewall functionality to validate the safety and security of the data before sending it to the interface 210 (e.g., PCMCIA or other suitable interface) that is responsible for taking the data and delivering it to the mobile communications device 220 (e.g., PC, laptop, PDA, mobile email device).

In some embodiments the Red Side 110 may also be considered to be 'partitioned' into a demilitarized zone (DMZ) encompassing the firewall 160 and the packet inspection 170. The DMZ is thus a subset of the Red Side 110 to provide access points such as remote access requirements). For example, a data server or bulletin board requiring remote access via the Internet can be accessed just after the hardware firewall 160 and before the packet inspection system 170, which will perform further security processing. Additional security processing may also be performed by WMCP 180.

Figure 4:
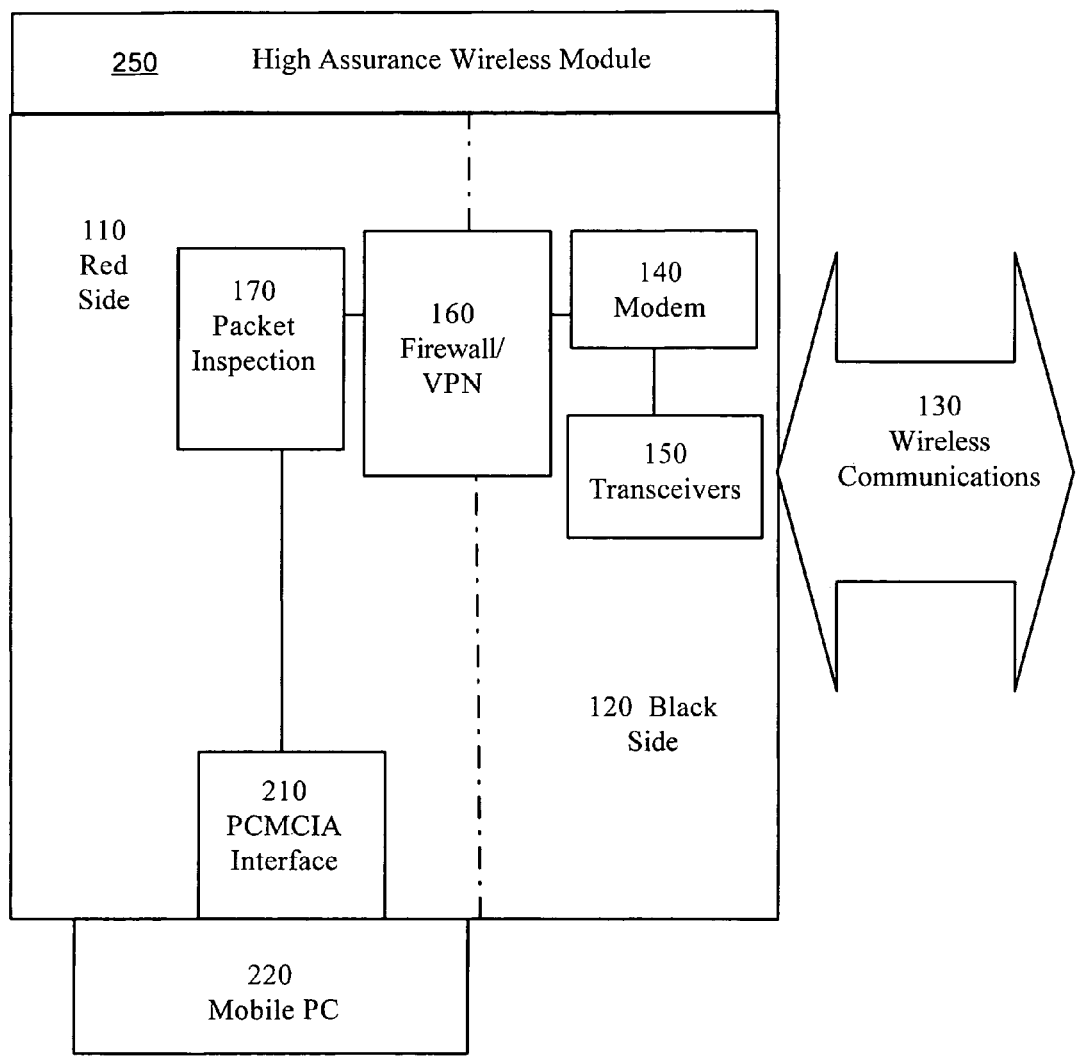
FIG. 4 illustrates a block diagram perspective of a high assurance communications module configured with a blended protection scheme having a firewall and packet inspection.

FIG. 4 is a block diagram of a high assurance wireless communication module 250 configured with a blended protection scheme in accordance with another embodiment of the present invention. Similar to the embodiment of FIG. 3, the high assurance module utilizes security Red/Black isolation architecture. In particular, a Red side 110 and a Black side 120 are provided, with the isolation and separation being enforced by a hardware firewall 160 that also may provide the encryption and VPN capabilities for the host system. Again, the modem 140 and transceivers 150 are configured to provide wireless communication 130 however other communication protocols can employ embodiments of the present invention.

Hardware firewall and VPN 160 have responsibilities for system configuration, wherein this functionality can be provided by a dedicated chipset or by a more general processor like a digital signal processor (DSP). Further, the system could be extended to implement modem 140 and transceivers 150 either as a single or a series of more general/reconfigurable processors to operate an SCA. The packet inspection system 170 monitors the data packets after they have been filtered and decrypted through the hardware firewall and VPN 160, examining the packets for undesirable data/payloads, filter and/or altering the packets as needed.

In operation, data will arrive via the wireless communication network 130 into the transceivers 150, and be demodulated at the modem 140. The hardware firewall 160 and VPN check to see if the data arriving should be allowed to pass from the Black side 120 into the Red side 110. If the data is expected or arriving from a known source, the port is not blocked and the data is allowed to pass. The data is then decrypted, if necessary, before being passed to the packet inspection system 170. The packet inspection system 170 examines not only the packet header for correctness but also the packet payload for any known malware. If the payload is deemed unsafe, the packet inspection system 170 takes the necessary actions to correct or discard the data. Once the data is deemed safe by the packet inspection system 170, it is handed to the interface 210 (e.g., PCMCIA) that is responsible for taking the data and delivering it to the mobile communications device 220 (e.g., PC, laptop, PDA, mobile email device). It should be noted that when the firewall 160 and/or packet inspection system 170 detect a potential attack, they can be configured to log the information locally and/or inform the device driver on the host system so it can log the information and/or warn the host system's operator.

Figure 5:
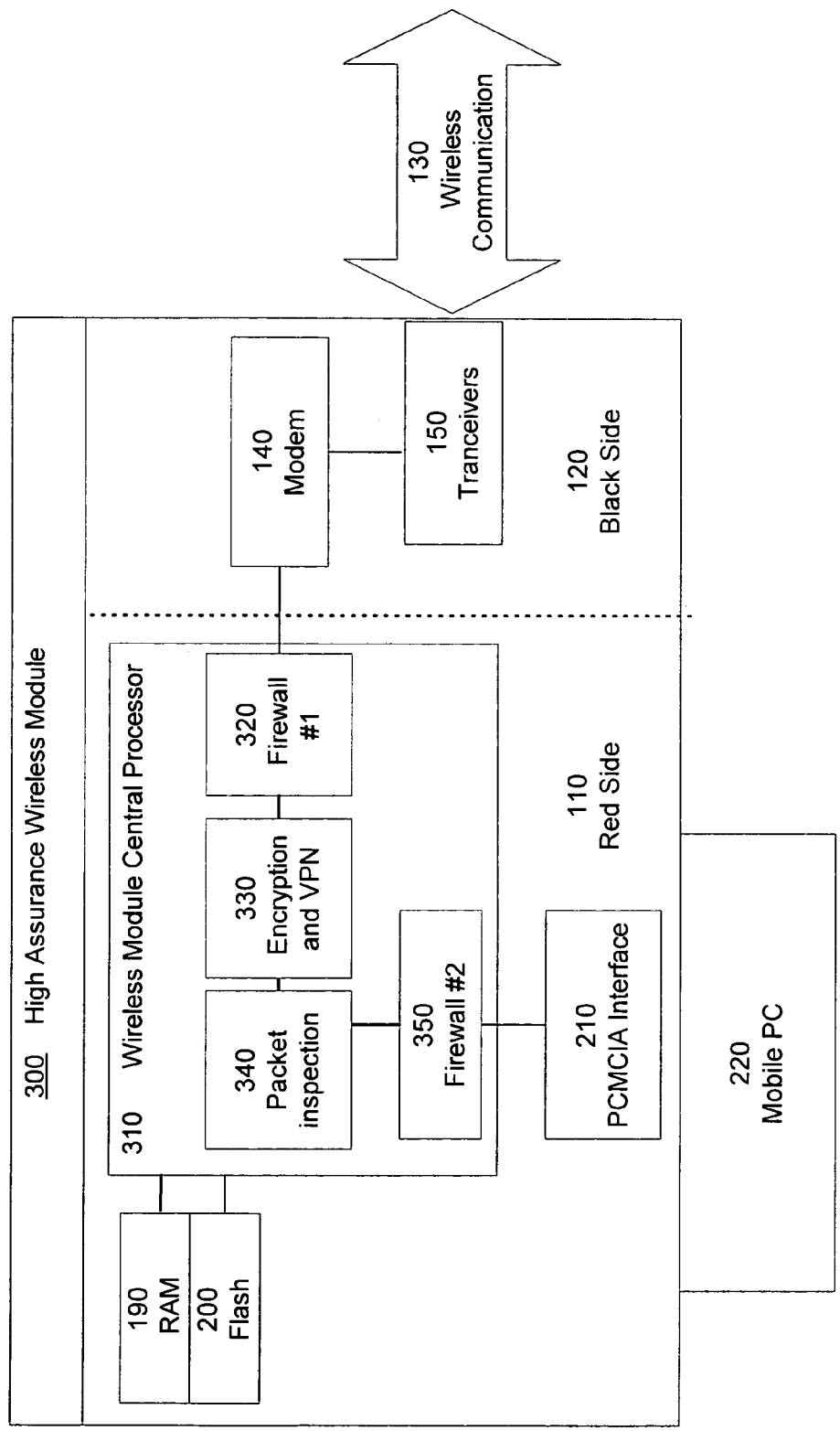
FIG. 5 illustrates a block diagram perspective of a high assurance communications module configured with a blended protection scheme with an integral WMCP.

FIG. 5 is a block diagram of a high assurance wireless communication module 300 configured with a blended protection scheme in accordance with another embodiment of the present invention. Again, the high assurance communication module 300 utilizes security Red/Black isolation architecture that includes a Red side 110 and a Black side 120. However, the isolation and separation are enforced by a wireless module central processor (WMCP) 310 that provides a first firewall 320 coupled between the modem 140 and the encryption section 330 and a second firewall 350 coupled between the encryption section 330 and the PCMIA interface 210. The firewall 320 protects the system from attacks originating from the network outside the system. The firewall 350 protects the system from attacks originating from the mobile PC 220/host side. The WMCP 310 also includes encryption and VPN 330 capabilities for the host system. Again, the modem 140 and transceivers 150 are configured to provide wireless communication 130, such as IEEE 802.11a, b and g, but other communication protocols (e.g., wired and wireless) are within the scope of the present invention.

The overall system booting, management, communication, and other functionality is provided by the WMCP 310, which has access to RAM 190 and Flash 200 for boot and operations. WMCP 310 has an interface module 210 (e.g., PCMCIA) for interfacing into the mobile communications device 220 (e.g., PC or any other host system). The WMCP 310 also can provide the software defined radio functionality for the module like an SCA. Further, the system could be extended to implement modem 140 and transceivers 150 either as a single or a series of more general/reconfigurable processors to operate an SCA. The capabilities and functionalities for packet inspection 340, encryption/VPN 330 and firewalls 320, 350 are provided by software/firmware as dedicated functions on the WMCP 310.

In operation, data from the wireless communication section 130 will arrive via the wireless network into the transceivers 150, and the data is demodulated at the modem 140. The WMCP 310 checks if the data arriving is allowed past the Black side 120 into the Red side 110. If the data is expected or arriving from a known source, the port is not blocked and the data is allowed to pass. The data is then decrypted, if necessary. The WMCP 310 examines not only the packet header for correctness but also the packet payload for any known viruses or aggressive malware (e.g., keystroke repeaters, drive scanners looking for non-cookie type data). If the payload is deemed unsafe, the WMCP 310 can take the necessary actions to correct or discard the data. Once the data is deemed safe by the WMCP 310, it is then delivered to the interface 210 (e.g., PCMCIA) that is responsible for taking the data and delivering it to the mobile communications device 220 (e.g., laptop or other host device).

Also in operation, outbound data is checked by WMCP 310 to see if the data is expected, allowed, and addressed to a destination not blocked or filtered. Attempts from the host to access the WMCP 310 can be detected and blocked by the firewall 350.

Multi-Channel High Assurance Architecture

Figure 6A:
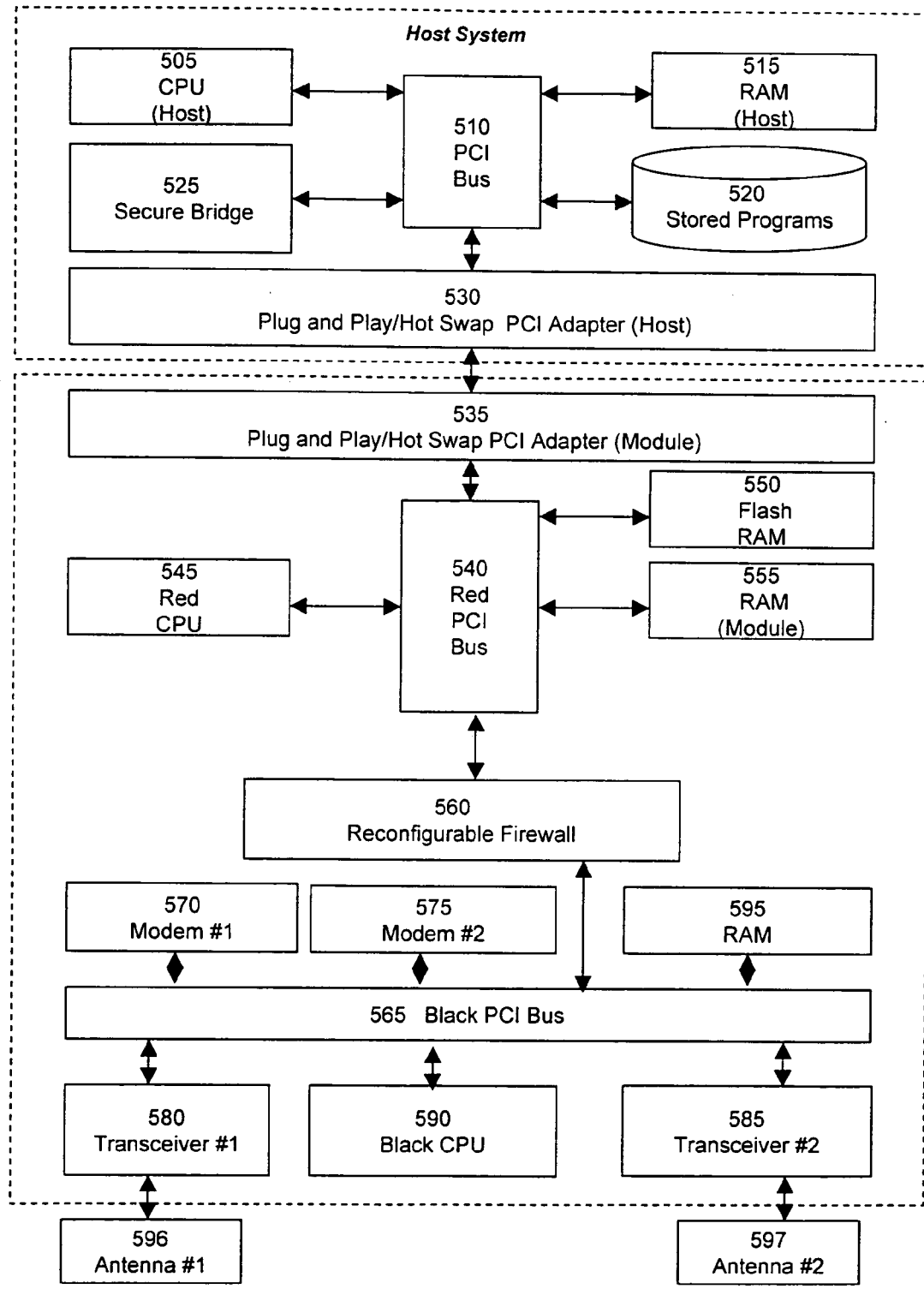
FIG. 6a shows a block diagram perspective of a host system coupled to a multi-channel high assurance module in a wireless configuration and having a reconfigurable firewall

FIG. 6a is a block diagram of a two channel high assurance plug-and-play wireless communication module 500 such as PCMCIA, CF or mini-PCI form factor, or other such PC cards. This embodiment implements a Red/Black isolation system similar to that used in military radios, and it is also possible to have a one channel, or multi-channel card. In this embodiment, there are two different waveforms for illustrative purposes, namely IEEE 802.11a/b/g (WIFI) and Blue-Tooth (BT). Components may include Plug and Play module 535, Red PCI Bus 540, Red CPU 545, as well as the reconfigurable firewall 560, Black PCI Bus 565, modem #1 570, modem #2 575, transceiver #1 580, transceiver #2 585, and the Black CPU 590. These components may be implemented on a single platform such as ASIC or FPGA, for example a Xilinx II Pro, which combines reconfigurable logic gates, I/O transceivers, general purpose processor core(s) and memory interfaces. Alternatively, a combination of FPGA, DSP, and WIFI or BT chipsets may be employed. It should be readily apparent that the communications channels do not have to be wireless. Furthermore, the channels can be software reconfigurable.

Antenna #1 596, modem #1 570 and transceiver #1 580 comprise the WIFI set, and in some instances the modem 570 and transceiver 580 may be integrated into a single integrated chipset. Antenna #2 597, modem #2 575 and transceiver #2 585 comprise the BT set, and in some instances modem #2 575 and transceiver #2 585 may also be combined into a single integrated chipset. The modems 570, 575 connect to the Black PCI bus 565, which in this example is a PCI bus, but could also be implemented with other bus structures and techniques, such as switched fabrics. The modems 570, 575 and transceivers 580, 585 may optionally be software-reconfigurable, as would be the case in a software defined radio (SDR), wherein reconfiguration is performed by the Black CPU 590 which downloads verified software from the Red CPU 545 via the Red PCI bus 540 (or other suitable bus structure), firewall 560, and Black PCI bus 565.

The Black CPU 590 with memory 595 hosts the modems 570, 575. In addition, if encryption is employed to secure the data as in some VPNs, Black CPU 590 also generates the public and private keys and performs the Black side processing. The Black CPU 590 can be protected by computer security software including, for example, a software firewall and anti-virus programs.

Black data from the modems 570, 575 is sent to/from the reconfigurable firewall 560, which in one embodiment is implemented in a FPGA. Reconfiguration of the firewall 560 to adapt to changing security threats, update algorithms, or fix bugs, is performed from the Red side by Red CPU 545 via the Red PCI bus 540. The Red CPU 545 together with memory 555 manages Red side security functions which include key generation, Red side encryption/decryption, network address translation (NAT), port address translation (PAT), Internet routing, management of demilitarized zone (DMZ) router functions, detection of port scanning, packet filtering and threat signature detection, and concealment (stealth) of unused ports. The Red CPU 545 can also be protected by anti-virus and firewall software. In addition, the Red CPU 545 is made to be self-booting by virtue of diagnostic and high assurance kernel software, described in reference to FIG. 8, and stored in the flash memory 550, which also includes plug-and-play support of the plug-and-play/hot swap PCI adapter module 535 or other suitable plug-and-play/hot swap interface. A log file of detected attacks and other key security incidents such as downloads are also logged and stored on both flash memory 550 and host system hard disk 520.

The host system includes host CPU 505, PCI bus 510 or other bus structure, memory module 515, hard disk 520, and security module/network interface 525. The host system provides certain services to the high assurance wireless system, including storage of applications, firewall and modem software used for re-boots, event logging, and hosting of system software including high assurance object request broker (ORB) middleware, and core framework (CF) software based on a software communications architecture (SCA). In instances where the high assurance wireless system is embedded within a mobile device, such as in a wireless PDA or smart phone, or Intel Centrino equipped laptop computer, certain variations of the architecture may be appropriate. For instance, the firewall function 560 may be moved to the secure bridge 525, and plug-and-play adapters 530 and 535 can be replaced with a PCI bridge (not shown).

Figure 6B:
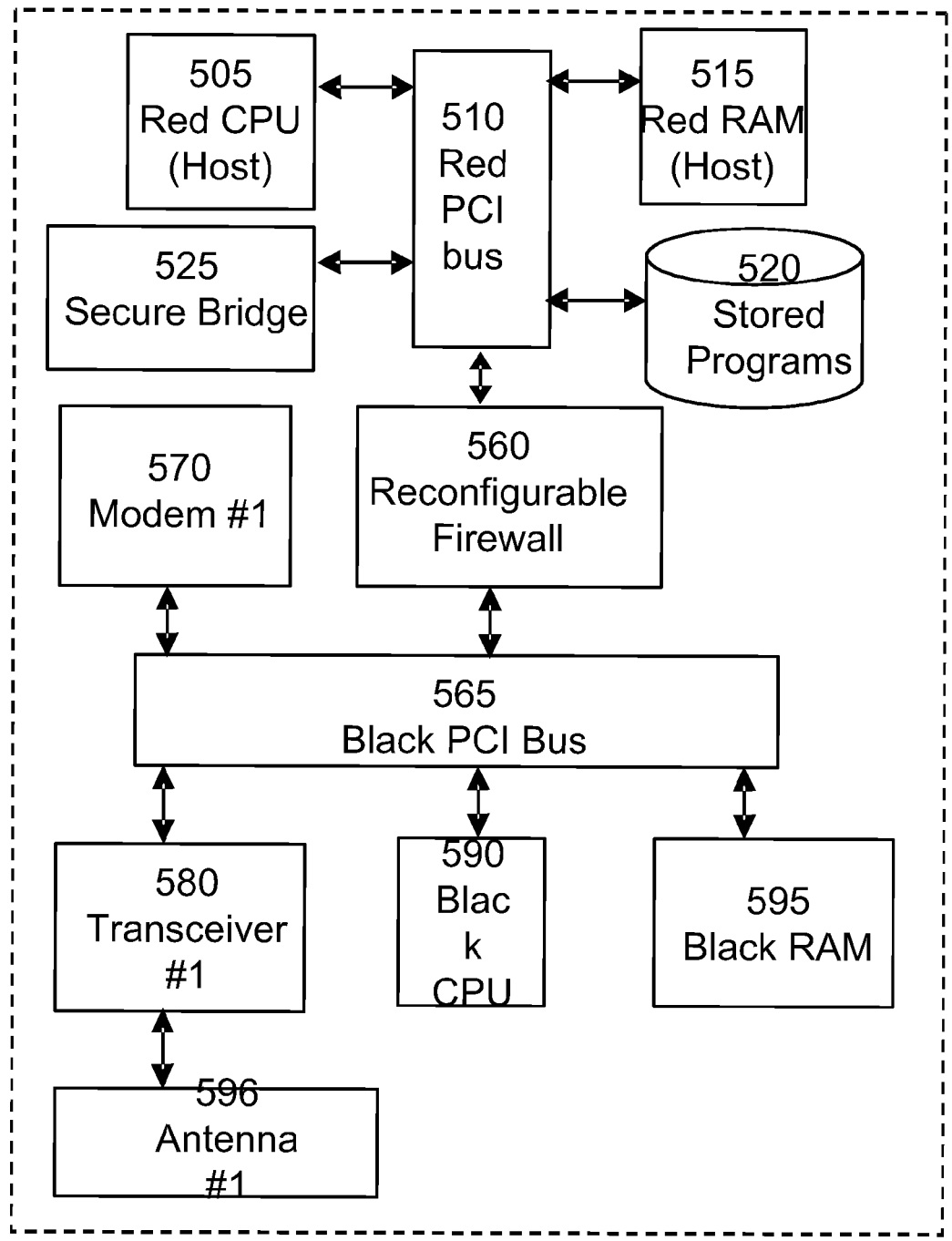
FIG. 6b shows a block diagram perspective of a high assurance communications module configured with a blended protection scheme for a single channel with the elements of FIG. 6a integrated onto a motherboard.

In other embedded installations, further simplification is possible if all components are going to be mounted on the motherboard. For example, Red CPU 545 can be eliminated and its functions assumed by the host CPU 505; module RAM 555 can be eliminated and its functions assumed by the host RAM 515; flash memory 550 can be eliminated with log files only being written to hard disk 520; and Red PCI bus 540 can be eliminated with firewall 560 connecting directly to host PCI bus 510. Architecture for such an embedded application is shown in FIG. 6b. Note that this embodiment can be extended to multi-channel just as shown in FIG. 6a.

High Assurance Self-Booting Kernel Software for Red CPU

Figure 7:
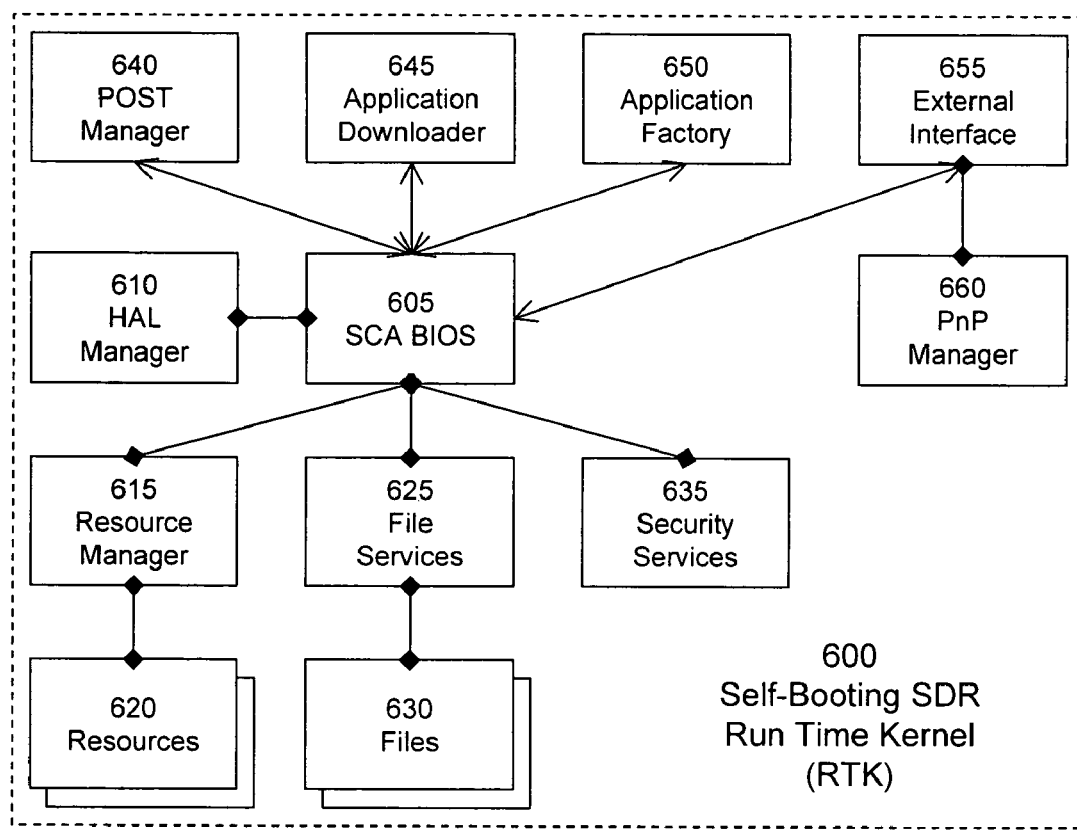
FIG. 7 illustrates a self-booting SCA run time kernel (RTK) coupled between various modules in accordance with an embodiment of the present invention.

FIG. 7 illustrates a self-booting software defined radio (SDR) kernel 600. This kernel 600 could run, for example, on the Red Processor 545 and Black Processor 590 noted in FIG. 6a, and be stored on FPGA's for Red and Black. In FIG. 6b, the kernel could run on the Black Processor 590 and the Red/Host Processor 505. In one embodiment, the SDR module includes a "minimum" basic input/output system (BIOS) 605, "built-in" functions programmed into the SDR module, and stored entirely on the module's internal file systems without need to access files from an external system such as the host's disk drive. The "minimum" BIOS is the BIOS needed to deploy a simple software-defined wireless communication device on a public, private or tactical wireless service such as the amateur band, Citizens Band, "family talk" or first-responder emergency services. Since the BIOS are "minimum" by definition, the BIOS must be both extensible and scalable. Extensions to accommodate additional security, multi-media, quality of service (QoS) or other features may be added to the described SCA.

The BIOS 605 generally contains multiple run-time software modules. There is a Hardware Abstraction Layer (HAL) manager 610, which provides a method for providing run-time hardware abstraction for general purpose processors (GPP), application specific integrated circuits (ASIC), field programmable gate arrays (FPGA), digital signal processors (DSP), and other hardware for SDR such as those under development by the SDR Forum and other industry organizations. With HAL 610, SDR applications are computing platform neutral and interact through the BIOS 605 with the module's resource manager 615 to the HAL software 610 on the remote host CPU (not shown) or network server via the network interface (not shown). In one embodiment, the module-specific hardware resource information is based on an open standard for HAL developed by industry organizations such as the SDR Forum or OMG. In an alternative embodiment, the HAL standard is a de-facto standard for wireless devices established by manufacturers such as Sun Microsystems for Java, Palm Computing for Palm/OS or Microsoft for Windows CE and .NET. The Resource manager 615 provides information to the BIOS 605 about the characteristics and availability of module resources 620, identifies the resource as "unavailable" when allocated or failed, and identifies the resource as "free" when unallocated or de-allocated.

A File services 625 software module provides minimum file management to read, write, and erase files 630, allocate and de-allocate memory on file devices such as flash memory and RAM on the SDR module based on file operations such as read, write and erase, and perform "garbage collection" or memory re-organization of file devices on the SDR module.

An additional software module is the Security services 635 which manages hardware and software security kernels within the SDR module and provides minimum security services to the BIOS 605. In one embodiment, security manager 635 maintains a security kernel version number and validates security checksum requests from the POST 640, Application Download 645 and Application Factory 650 functions for verification and validation (V&V) process to confirm integrity of SDR downloads and applications. This function inspects and confirms the integrity of the SDR module's current programming.

The POST manager 640 function initiates and manages the power-on self-test (POST) functions upon system boot-up, or upon a command by the module controller to initiate a self-test. The POST manager 640 receives resource configuration characteristics from the BIOS 605 and manages self-test functions via the BIOS 605.

There is an Application downloader 645 that controls downloading of SDR reconfiguration software via a "download" application programming interface (API) including over-the-air (OTA) downloads, and confirms security integrity of the download. A run-time method of initiating, transporting, inspecting, verifying and deploying reconfiguration source or binary code which may include over the air (OTA) code distribution is known by those skilled in the art. The download function typically conforms to one or more industry download API(s). Additional functions can include checking for LAB certification (e.g. UL, WINLAB), and calculation/verification of an integrity code, such as a checksum, for downloaded data.

The Application factory 650 is a piece of the SCA Core Framework function implemented on the SDR module. In a further embodiment, SCA applications, such as waveform class files in Java, are pre-compiled by a master application factory running on the host CPU and launched by the application factory 650 on the SDR module. The application factory launches the application using resources, file services and security services through the BIOS 605. In another embodiment, the application factory 650 employs middleware such as a lightweight object request broker (ORB) or Java remote method invocation (RMI). In an alternative embodiment, the application factory 650 is replaced by a container application, such as a micro-browser, used to host and launch remotely compiled methods such as Java "applets".

There is an external interface 655 module that is responsible for external interfaces to the module. In one embodiment, the interfaces include a plug-and-play (PnP) interface 660 between the module and the host system, and serial digital interfaces to digital transceivers and/or adjacent modules. The PnP interface manager 660 of the host typically conforms to one of a plurality of PnP industry specifications including but not limited to Peripheral Component Interconnect (PCI), Universal Serial Bus (USB), and IEEE 1394 "Firewire", depending on the type of PnP interface connector used. The external interface 655 is also responsible for distributing system clock timing signals over the PnP and LVDS interfaces.

Self-Booting Process

Figure 8:
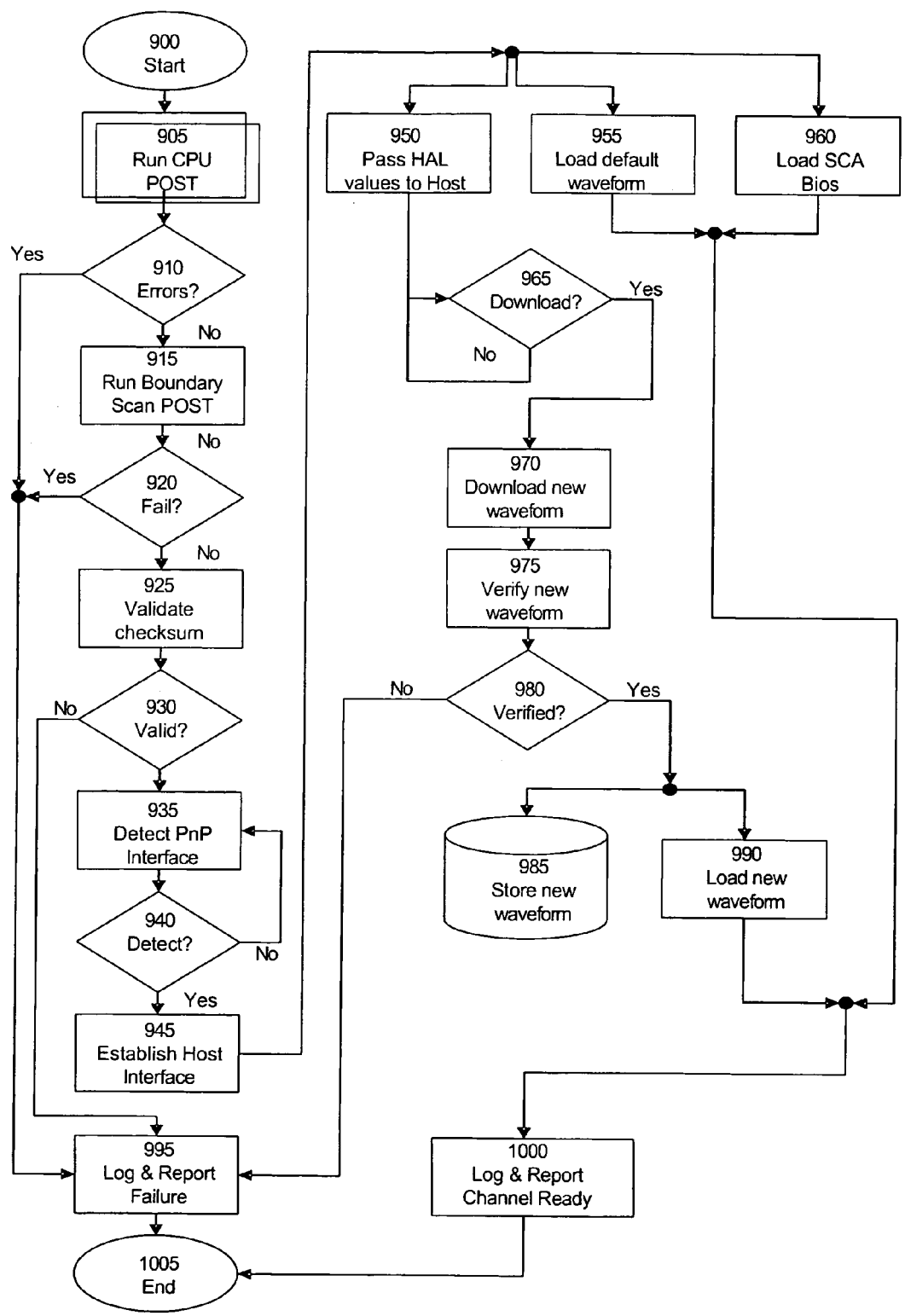
FIG. 8 is a flowchart illustrating the processing within a self-booting processor in accordance with an embodiment of the present invention.

A flowchart for one self-boot embodiment is shown in FIG. 8 illustrating a top level processing perspective of the self-booting process. This processing may comprise the loading of a default waveform, and the download, verification, storage and loading of a new waveform. The start 900 commences with some event, such as power-up, that triggers the module CPU to execute the run-time kernel and commence execution of the CPU power-on self test (POST) 905. There is initial check of certain criteria 910 which would indicate some internal errors or other problems that would prevent the device from functioning. The built-in test (BIT) performs verification of those components that are testable and accessible. If the verifications step fails 910, an error report of the failure is reported 995 and processing ends 1005. If the verification step passes, processing continues with run boundary scan POST 915. Once again, there is a verification check 920 and a failure results in logging the error 995 and end of processing 1005.

If the boundary scan passes, the next step is the checksum 925 and the validation of the security checksum 930. A failure is processed as already described herein by logging the error 995 and ending 1005. If the checksum test is successful, the processing checks to identify a PnP interface 935. The interface detection is verified 940 and failure proceeds to test again for the PnP interface. If there is a PnP interface detected, the system tries to establish a host interface 945 and perform certain functions such as loading SCA BIOS 960 and loading the default waveforms 955, and passing the hardware abstraction layer (HAL) values identifying the hardware resource characteristics and availability to the host 950. The passing of the HAL values 950 checks whether a download is available 965. If there is no download available 965, the system loops until a download is available. If a download is available, a new waveform is downloaded 970 and verified 975. The verification test 980 may result in a failure, which proceeds to the failure route of logging and reporting the error 995 and ending 1005. If the verification test 980 is positive, the new application is stored 985 and the new waveform is loaded. Finally, the events and data are logged 1000 and the channel is ready for processing.

Additional detail on the self-booting kernel and its applications are provided in the previously incorporated U.S. application Ser. No. 10/618,950, titled, "Self-Booting Software Defined Radio."

Blended Protection Module Architectures

Figure 9:
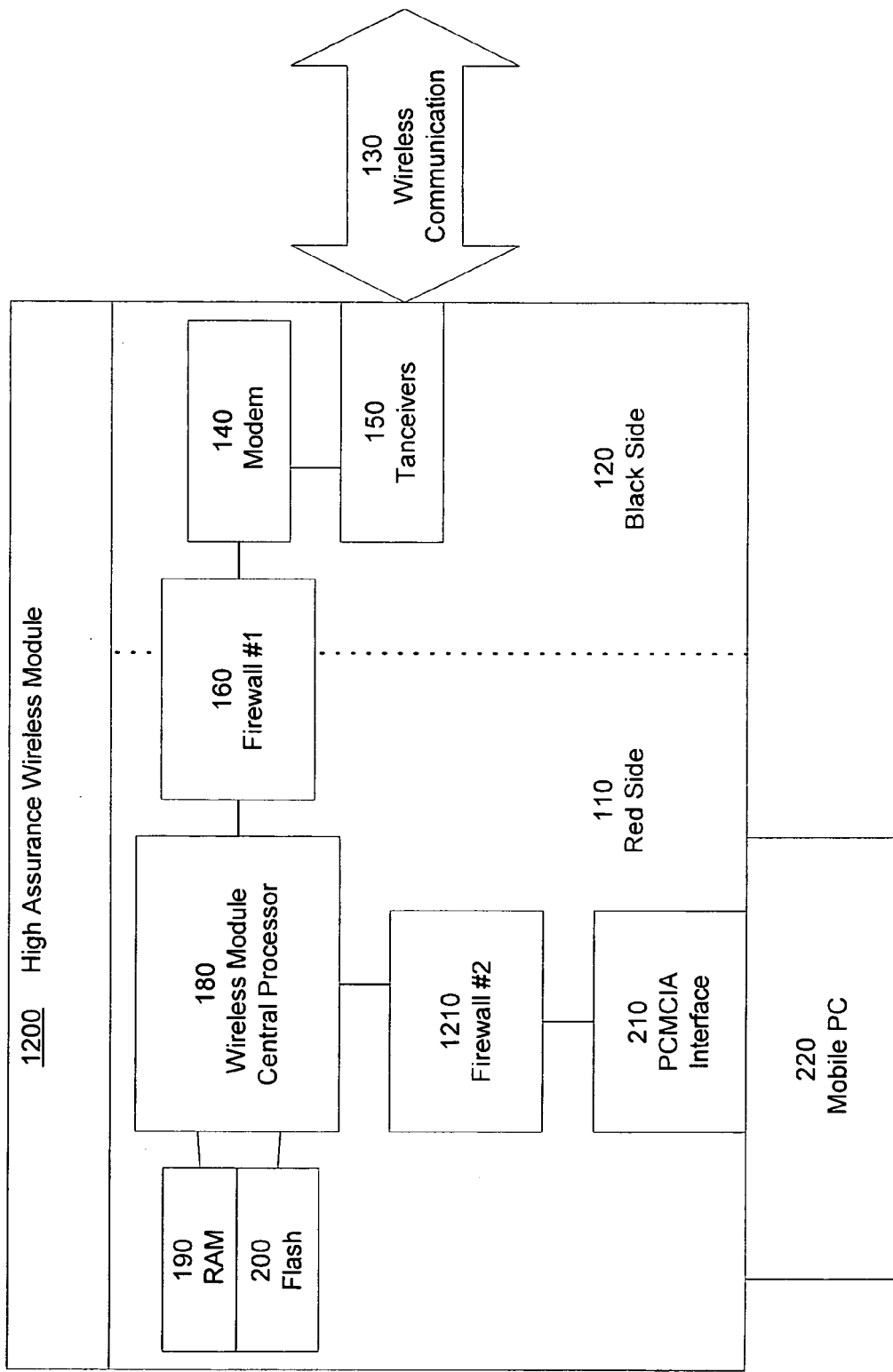
FIG. 9 illustrates a block diagram perspective of a high assurance communications module configured with a blended protection scheme having multiple firewalls and a WMCP.

FIG. 9 is a block diagram of a high assurance wireless communication module 1200 configured with a blended protection scheme in accordance with one embodiment of the present invention.

This embodiment is similar in some respects to the embodiment of FIG. 3. The high assurance communication module 1200 utilizes security Red/Black isolation architecture, namely a Red side 110 and a Black side 120, with the isolation and separation being enforced by a first firewall 160 and a second firewall 1210.

The modem 140 and transceivers 150 are coupled to the wireless communication 130. The overall system booting, management, and communication is provided by the wireless module central processor (WMCP) 180, which has access to RAM 190 and flash 200 for booting and operations. The WMCP 180 has a PCMCIA interface module 210 for interfacing into the mobile PC/host system 220. Coupled between the WMCP 180 and the Interface 210 is a second firewall 1210. There is no specific packet inspection system as noted in FIG. 3.

In operation, data arrives via the communications network 130 into the transceivers 150, and then is demodulated at modem 140. The firewall 160 checks the data arriving at the Black side 120 and determines whether it should be allowed into the Red side 110. If the data is expected or arriving from a known source, the port is generally not blocked and the data is allowed to pass. The data is then processed by the WMCP 180 which can also provide software defined firewall functionality to validate the safety and security of the data before sending it to the interface 210 that is responsible for delivering the data to the mobile communications device 220. The second firewall 1210 isolates the data transmission of the mobile communications device 220 from the Red side 110.

Figure 10:
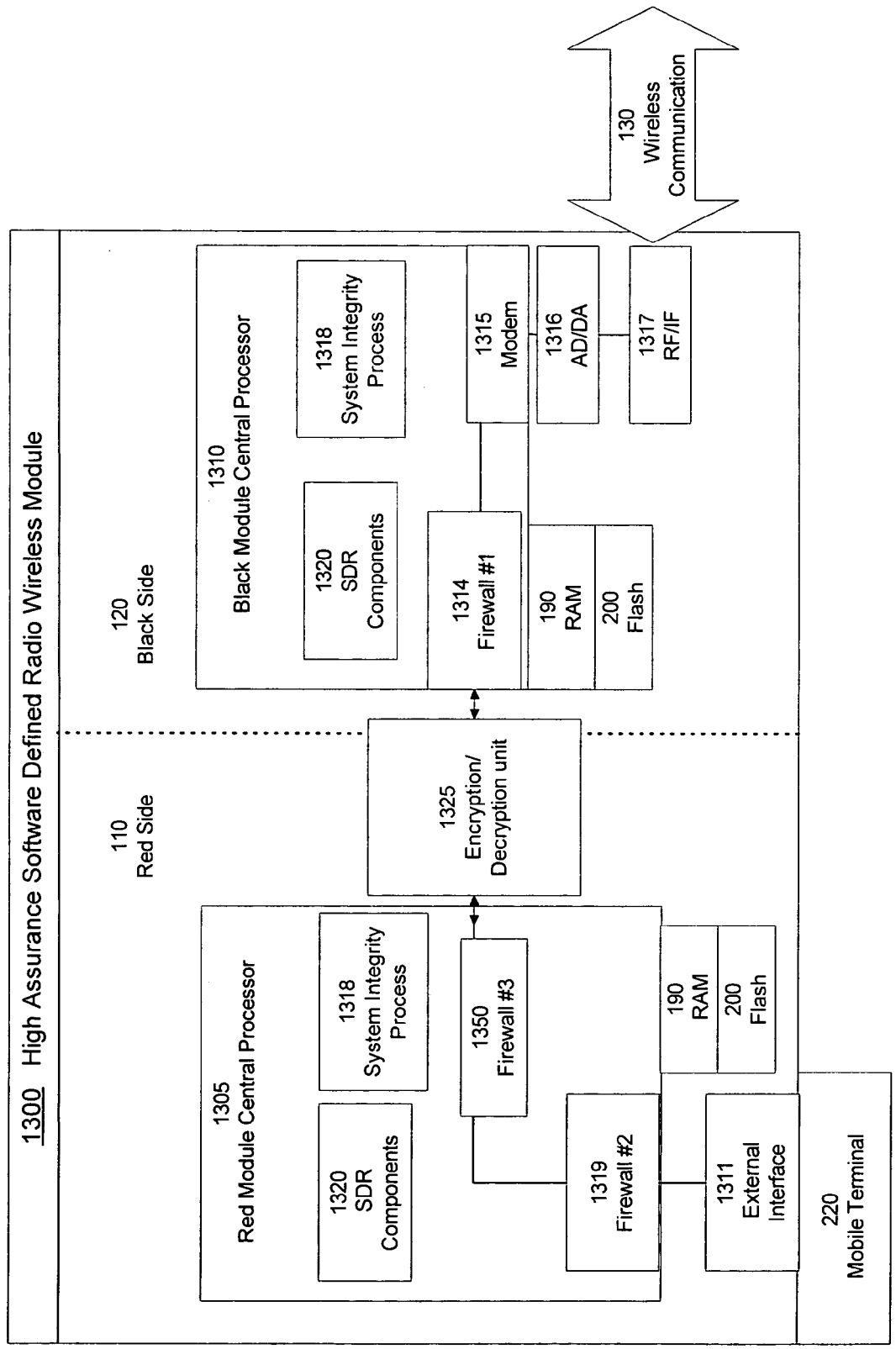
FIG. 10 illustrates a block diagram perspective of a high assurance communications module configured with a blended protection scheme such as for a type 1 NSA software defined radio.

FIG. 10 is a block diagram of a high assurance, NSA type 1, software defined radio 1300 configured to protect the host and radio system from a blended attack. The architecture is similar in certain concepts described herein, and large parts of the system are defined in software. This embodiment includes a Red Module Central Processing unit 1305 and a Black Module Central Processing unit 1310. The Black Module unit 1310 implements the front-end radio portions, such as the Modem 1315 and interfaces to A/D and D/A processing 1316 and the RF/IF section 1317, in software as part of the reconfigurable software definition. These can be running on Field Programmable Gate Arrays (FPGAs), General Purpose Processors (GPPs), other such processing systems or combinations thereof. Each module 1315, 1316, and 1317 typically runs a series of SDR (Software Defined Radio) Components 1320 that could include an Object Request Broker (ORB), Application Managers and Launchers, Domain Managers and other such processes.

One implementation is a SCA 2.2 Core Framework and supporting processes. The two Modules (Red 1305 and Black 1310) are separated by an Encryption/Decryption unit 1325 or INFOSEC processor that provides the boundary between what was traditionally known as a "secured" Red side and "unsecured Black side. Traditional radios were not flexible in their configuration and thus relied on this enforced isolation for security. Since it was assumed that only trusted system were on the network and the resources on the radio system were fixed and not exploitable. With the advent of highly definable radios, stronger security measures must be put in place to protect the Black and Red sides, Host system and the network. As described herein, the use of terminology such as Red Side and Black Side is maintained for convention. In one embodiment, there is a Black module firewall 1314 and a Red module firewall 1319 wherein each protects its respective module. The black module 1310, red module 1305 and host system 220 are protected from the external network by the Black Module firewall 1314, which is responsible for stopping external attacks. The red module 1305, black module 1310 and other systems on the external network are protected from the host 220 or processes running on the host end of the network by the Red Module firewall 1319. Thus an infected Host system or a malicious operator cannot alter the radio, and thus the potential damage to the network integrity is limited.

In this embodiment, each module has a running process, such as a System Integrity Demon (SID) 1318 that verifies all necessary processes are running, such as the two firewalls, 1314 and 1319, to verify that basic functionality is working.

The System Integrity Processes 1318 can also verify the checksum on the process images stored in flash 200 have not been manipulated in a malicious manner.

Another firewall 1350 could be included on the Red module Central Processor 1305 right after the data is decrypted by the encryption/decryption unit 1325. This way it can perform firewall functions on the decrypted data streams in the case where the packet headers an encrypted.

Figure 11:
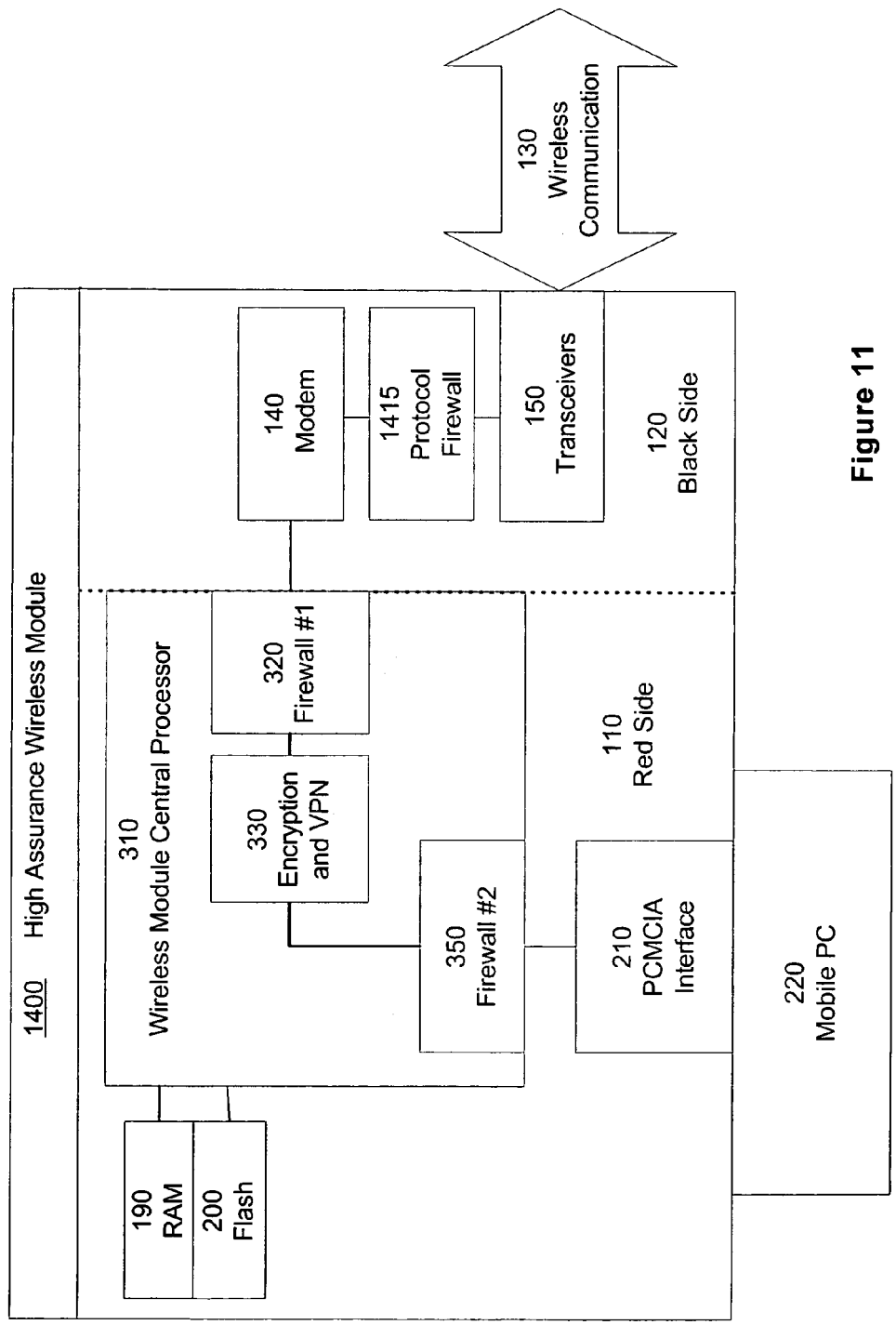
FIG. 11 illustrates a block diagram perspective of a high assurance communications module configured with a blended protection scheme similar to FIG. 5, but including a protocol firewall.

FIG. 11 is a block diagram similar to FIG. 3, but with the addition of a Protocol Firewall 1415 in between the Transceivers 150 and the Modem 140. This Protocol Firewall 1415 is responsible for such functions as the filtering of the radio protocol messages. The Protocol Firewall 1415 examines the 802.11 protocol messages and filters out messages as per instructions. The Firewall 1415 could look for patterns that suggest an attack is taking place such as if there are more then a certain number of 802.11 disconnect protocol messages within a given time period. It could also simply allow the host operator to manually block certain protocol message. The firewall 1415 can also combine pattern recognition and block instructions. It should also be clear that this Protocol Firewall 1415 could be integrates inside the radio's 802.11 stack, incorporated into the modem 140, and could also be applied to other implementations described herein such as the embodiments of FIG. 10.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A device providing a protection scheme for a communications system, the device comprising:
    a communications section for processing incoming wireless communications;
    a firewall coupled to said communications section;
    a host interface, with said firewall coupled between said host interface and said communications system, and isolated by said firewall from the communications section, and
    a wireless module central processor (WMCP) wherein the WMCP is configured for providing booting and management operations, adapted for passing inspected data to said host interface, and is further configured to provide software defined radio functionality for the device.

2. The device of claim 1 further comprising a packet inspection system coupled between the firewall and the host interface.

3. The device of claim 2 wherein the packet inspection system performs at least one of the features selected from the group consisting of: uniform resource link (URL) blocking, domain name blocking, keylog blocking, malware inspecting, spyware inspecting and virus inspecting.

4. The device of claim 1, wherein said WMCP comprises said firewall.

5. The device of claim 4 wherein the device further comprises at least one section of memory coupled to the WMCP.

6. The device of claim 5, wherein a log file of detected attacks and other selected security incidents are logged and stored in said memory.

7. The device of claim 1 wherein the communications section comprises:
    a transceiver for receiving said wireless communication from a wireless network; and
    a modem for demodulating received wireless communication before passing it to the hardware firewall.

8. The device of claim 7 further comprising a protocol firewall between said transceiver and said modem.

9. The device of claim 7, wherein said modem comprises a wireless protocol stack, said protocol stack providing protocol firewalling and filtering capabilities.

10. The device of claim 1 wherein the communications system is selected from at least one of the group consisting of: a personal computer (PC), a laptop, a personal digital assistant (PDA), cell phone, a mobile email device, and a server.

11. The device of claim 1 wherein the device is integrated into one of the group consisting of: a wireless modem, a wired modem, a USB module, a plug-and-play PC card module, a PCI card module, a switched fabric module, cell phone, and a chip/chip set on a motherboard of the communications system.

12. The device of claim 1, wherein the firewall performs security functions, said security functions include at least one of the group consisting of: public/private key exchange, automatic public/private key exchange, VPN, URL blocking, Domain Name Blocking, Red side encryption/decryption, network address translation (NAT), port address translation (PAT), stateful packet inspection firewall, Internet routing, management of demilitarized zone (DMZ) router functions, detection of port scanning, packet filtering and threat signature detection, system integrity process to verify system integrity, and concealment of unused ports.

13. The device of claim 1, further comprising an outbound firewall for blocking and/or filtering outbound network traffic.

14. The device of claim 13, where said outbound firewall operates in conjunction with the communications system to allow or deny control network access to one or more individual programs.

15. A device for providing a protection scheme for a host transmitting and/or receiving wireless communications, the device having a Red/Black isolation architecture and comprising:
    a Black side communicatively coupled by at least one channel with said wireless communications;
    a Red side coupled between said Black side and said host;
    a reconfigurable wireless module central processor (WMCP) for enforcing isolation and/or separation between said Red side and said Black side, said WMCP comprising at least one firewall, an encryption capability for said host, and a packet inspection module adapted to receive decrypted packet data to examine a packet payload; and
    a host interface coupled to said host wherein the WMCP is further configured for providing booting and management operations, adapted for passing inspected data to said host interface, and further configured to provide software defined radio functionality for the device.

16. The device of claim 15, wherein the device is integrated into at least one of a group consisting of: wireless modem, a USB module, a plug-and-play PC card module, a PCI card module, a cell phone, a switched fabric module and an integrated chip/chip set on a host motherboard.

17. The device of claim 15, wherein the WMCP provides security functions, said security function includes at least one of the group consisting of: public/private key exchange, automatic public/private key exchange, VPN, URL blocking, Domain Name Blocking, Red side encryption/decryption, network address translation (NAT), port address translation (PAT), stateful packet inspection firewall, Internet routing, management of demilitarized zone (DMZ) router functions, detection of port scanning, packet filtering and threat signature detection, system integrity process to verify system integrity, and concealment of unused ports.

18. The device of claim 15, wherein said Black side further comprises a protocol firewall.

19. The device of claim 15, wherein said WMCP comprises a wireless protocol stack, said protocol stack providing protocol firewalling and filtering capabilities.

20. The device of claim 15, further comprising an outbound firewall for blocking and filtering outbound network traffic.

21. The device of claim 20, where said outbound firewall operates in conjunction with the host to control network access to one or more individual programs.

22. The device of claim 15, wherein a log file of detected attacks and other selected security incidents are logged and stored in at least one memory unit coupled to the WMCP.

* * * * *